(12) United States Patent
Takewa et al.

(10) Patent No.: US 11,046,341 B2
(45) Date of Patent: Jun. 29, 2021

(54) SATELLITE POSITIONING APPARATUS AND TRAIN CONTROL SYSTEM CAPABLE OF DETERMINING ACCURATE AND LIMITED POSITION RANGE OF MOVING OBJECT

(71) Applicant: MITSUBISHI ELECTRIC CORPORATION, Chiyoda-ku (JP)

(72) Inventors: Tomoaki Takewa, Tokyo (JP); Wataru Tsujita, Tokyo (JP); Masahiro Shikai, Tokyo (JP); Tadashi Yamamoto, Tokyo (JP); Masashi Asuka, Tokyo (JP); Seiya Nagashima, Tokyo (JP); Yoshitsugu Sawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 501 days.

(21) Appl. No.: 16/073,528

(22) PCT Filed: Jan. 17, 2017

(86) PCT No.: PCT/JP2017/001345
§ 371 (c)(1),
(2) Date: Jul. 27, 2018

(87) PCT Pub. No.: WO2017/145575
PCT Pub. Date: Aug. 31, 2017

(65) Prior Publication Data
US 2019/0031219 A1    Jan. 31, 2019

(30) Foreign Application Priority Data

Feb. 24, 2016   (JP) .............................. JP2016-033473

(51) Int. Cl.
*B61L 25/02* (2006.01)
*G01S 19/50* (2010.01)
*G01S 19/14* (2010.01)

(52) U.S. Cl.
CPC ............ *B61L 25/025* (2013.01); *B61L 25/021* (2013.01); *B61L 25/026* (2013.01); *G01S 19/14* (2013.01); *G01S 19/50* (2013.01); *B61L 2205/04* (2013.01)

(58) Field of Classification Search
CPC .... B61L 25/025; B61L 25/021; B61L 25/026; B61L 2205/04; G01S 19/14; G01S 19/50; G01S 19/396; G01C 21/28; G01C 21/30
See application file for complete search history.

(56) References Cited

U.S. PATENT DOCUMENTS 4,731,613 A * 3/1988 Endo ...................... G01C 21/28
                                                          342/357.31
5,323,152 A    6/1994 Morita
(Continued)

FOREIGN PATENT DOCUMENTS

EP    2 548 784 A2    1/2013
JP    3-291583 A      12/1991
(Continued)

OTHER PUBLICATIONS

International Search Report dated Apr. 4, 2017 in PCT/JP2017/001345 filed Jan. 17, 2017.
(Continued)

*Primary Examiner* — Zachary L Kuhfuss
(74) *Attorney, Agent, or Firm* — Xsensus LLP

(57) ABSTRACT

A moving path memory stores a moving path of a train in advance. A signal receiver receives satellite positioning signals. A position calculator calculates measured positions and receiver clock errors, based on the satellite positioning signals and the moving path. A error area calculator sets vector pairs, each consisting of arbitrary two vectors perpendicular to each other on a plane spanned by a tangent vector and a radial vector of a tangent circle of the moving path at the measured positions, and calculates an error area
(Continued)

for each vector pair, based on the measured positions, the receiver clock errors, and positions of positioning satellites. A position range extractor extracts a part of the moving path included in each error area, as a candidate position range corresponding to the error area. A position range restrictor determines a common area of the candidate position ranges, as a position range of the train.

14 Claims, 15 Drawing Sheets

(56) References Cited

U.S. PATENT DOCUMENTS

| | | | | |
|---|---|---|---|---|
| 5,488,559 | A * | 1/1996 | Seymour | G01C 21/30 342/357.31 |
| 5,563,608 | A | 10/1996 | Tachita et al. | |
| 6,018,704 | A * | 1/2000 | Kohli | H04B 1/7085 702/149 |
| 6,941,144 | B2 * | 9/2005 | Stein | G01S 5/0221 455/404.2 |
| 10,093,331 | B2 * | 10/2018 | Danielson | B61L 3/006 |
| 10,399,583 | B2 * | 9/2019 | Iwamoto | G01S 19/39 |
| 2001/0044681 | A1 * | 11/2001 | Diana | B61L 25/023 701/19 |
| 2004/0140405 | A1 * | 7/2004 | Meyer | B61L 25/023 246/122 R |
| 2004/0151388 | A1 * | 8/2004 | Maeda | G01C 21/30 382/232 |
| 2005/0065726 | A1 * | 3/2005 | Meyer | B61L 25/023 701/470 |
| 2007/0213927 | A1 * | 9/2007 | Ishigami | G09B 29/102 701/417 |
| 2009/0105893 | A1 * | 4/2009 | Kernwein | B61L 25/025 701/19 |
| 2012/0109510 | A1 * | 5/2012 | Ota | G08G 1/0104 701/400 |
| 2017/0029002 | A1 | 2/2017 | Iwamoto | |
| 2018/0009454 | A1 * | 1/2018 | Katsuragi | G01S 19/45 |
| 2018/0273063 | A1 * | 9/2018 | Tsujita | G01S 3/14 |
| 2018/0334179 | A1 * | 11/2018 | Aoyama | B61L 27/0005 |

FOREIGN PATENT DOCUMENTS

| | | |
|---|---|---|
| JP | 6-11560 A | 1/1994 |
| JP | 6-289778 A | 10/1994 |
| JP | 7-91978 A | 4/1995 |
| JP | 2004-338674 A | 12/2004 |
| JP | 5373861 B2 | 9/2013 |
| WO | WO 2015/159563 A1 | 10/2015 |

OTHER PUBLICATIONS

Iwamoto, T., "Upper-Bounding Bias Errors in Satellite Navigation," IEEE Workshop on Statistical Signal Processing (SSP), 2014, 4 total pages.

* cited by examiner

MOVING PATH OF
RECEIVING ANTENNA

ERROR AREA

MOVING PATH OF
RECEIVING ANTENNA

ERROR AREA

MOVING PATH OF
RECEIVING ANTENNA

ERROR AREA

SATELLITE POSITIONING APPARATUS AND TRAIN CONTROL SYSTEM CAPABLE OF DETERMINING ACCURATE AND LIMITED POSITION RANGE OF MOVING OBJECT

TECHNICAL FIELD

The present invention relates to a satellite positioning apparatus that determines a position range of a moving object based on satellite positioning signals received from a plurality of positioning satellites, such as global positioning system (GPS) satellites.

BACKGROUND ART

Generally, an error of satellite positioning increases locally at locations under degraded receiving conditions of radio waves. Therefore, in order to apply a result of satellite positioning to moving object control systems, such as a train control system and an automobile control system, it is necessary to calculate a position range certainly including a measured position and a true value of a position of a moving object.

Patent Document 1 discloses a method of limiting an error area by obtaining a common area of error areas each calculated for a combination of four GPS satellites.

Patent Document 2 discloses a method of calculating a position range of a train by calculating, for each GPS satellite, a circle on the intersection of a sphere centered at a GPS satellite with radius of a distance of received signal, and the earth's surface, setting a common area of the circles as an error area of a GPS positioning result, and extracting a track included within the error area.

Non-Patent Document 1 discloses a method of calculating an error area formed by two perpendicular vector components, by using three GPS satellites satisfying a predetermined criterion. The size of such an error area is determined by magnification coefficients obtained from angles of the satellite's position with respect to the two vectors. At first, an error area is obtained, which is formed by a track vector component in a GPS measured position on the track, and a radial vector component of a tangent circle of the track at the measured position. Next, the track is approximated by the tangent circle at the measured position, and a length of the track is approximately calculated, which is included within the position range of the true value. A position range of the train is calculated based on the calculated length of the track and the measured position.

CITATION LIST

Patent Documents

PATENT DOCUMENT 1: Japanese Patent Laid-open Publication No. JP H06-011560 A
PATENT DOCUMENT 2: Japanese Patent No. JP 5373861132

Non-Patent Documents

NON-PATENT DOCUMENT1: T. Iwamoto, "Upper-bounding bias errors in satellite navigation", IEEE Workshop on Statistical Signal Processing (SSP), 2014.

SUMMARY OF INVENTION

Technical Problem

According to the method disclosed in Patent Document 1, since fixed magnitudes of error are given in advance for various factors of error, there is a problem of calculating an incorrect error area not including a true value of the position, when an unexpected error occurs, for example, unexpected multipath waves interfere a certain satellite. In addition, the method disclosed in Patent Document 2 has a problem that the calculated position range becomes too large, except for a special case in which the UPS satellite is at the zenith. In addition, according to the method disclosed in Non-Patent Document 1, since the track is approximated by the tangent circle when calculating the position range, there is a problem that the position range can not be accurately obtained when the train is moving along a track with a large change in curvature that can not be approximated by a circle.

An object of the present invention is to provide a satellite positioning apparatus capable of overcoming the above problems and determining an accurate and limited position range of a moving object based on satellite positioning signals received from a plurality of positioning satellites.

Solution to Problem

According to an aspect of the present invention, a satellite positioning apparatus is provided for determining a positional range of a moving object based on a plurality of satellite positioning signals received from a plurality of positioning satellites, respectively. The satellite positioning apparatus is provided with: a moving path memory, a signal receiver, a position calculator, an error area calculator, and a positional range determiner. The moving path memory stores, in advance, a moving path of the moving object. The signal receiver receives the satellite positioning signals through a receiving antenna mounted at a predetermined position on the moving object. The position calculator calculates measured positions and receiver clock errors, based on satellite positioning signals received from three positioning satellites having a predetermined relationship among their relative positions, and based on the moving path, the measured positions indicating results of positioning the moving object, and the receiver clock errors indicating errors among clocks of the positioning satellites and a clock of the satellite positioning apparatus. The error area calculator sets a plurality of vector pairs, each of the vector pairs consisting of arbitrary two vectors perpendicular to each other on a plane spanned by a tangent vector and a radial vector of a tangent circle of the moving path at the measured position, and calculates an error area for each of the vector pairs, based on the measured positions, the receiver clock errors, and positions of the three positioning satellites used for positioning the moving object, the error area indicating an area on the plane in which the moving object may be positioned, thus calculating a plurality of error areas corresponding to the plurality of vector pairs. The positional range determiner determines the positional range of the moving object based on the plurality of error areas and the moving path.

Each one error area of the plurality of error areas is a rectangular area having sides along two vectors of a vector pair corresponding to the one error area. Lengths of the sides of the one error area depend on angles among vectors toward the measured positions from the positions of the three positioning satellites used for positioning the moving object, and the two vectors of the vector pair corresponding to the one error area. The lengths of the sides of the one error area further depend on the receiver clock errors. Each of the plurality of vector pairs is set to minimize lengths of sides of an error area corresponding to the vector pair.

Advantageous Effects of Invention

According to the satellite positioning apparatus of the present invention, it is possible to determine an accurate and limited position range of the moving object based on the satellite positioning signals received from the plurality of positioning satellites.

DESCRIPTION OF EMBODIMENTS

First Embodiment

The present invention is applied to a control system of a moving object that moves along a moving path provided with map information. Specifically, the present invention is applied to control systems of moving objects, such as a train moving along a track, and an automobile moving along a road. Hereinafter, in a first embodiment, a train will be described as an example.

Figure 1:
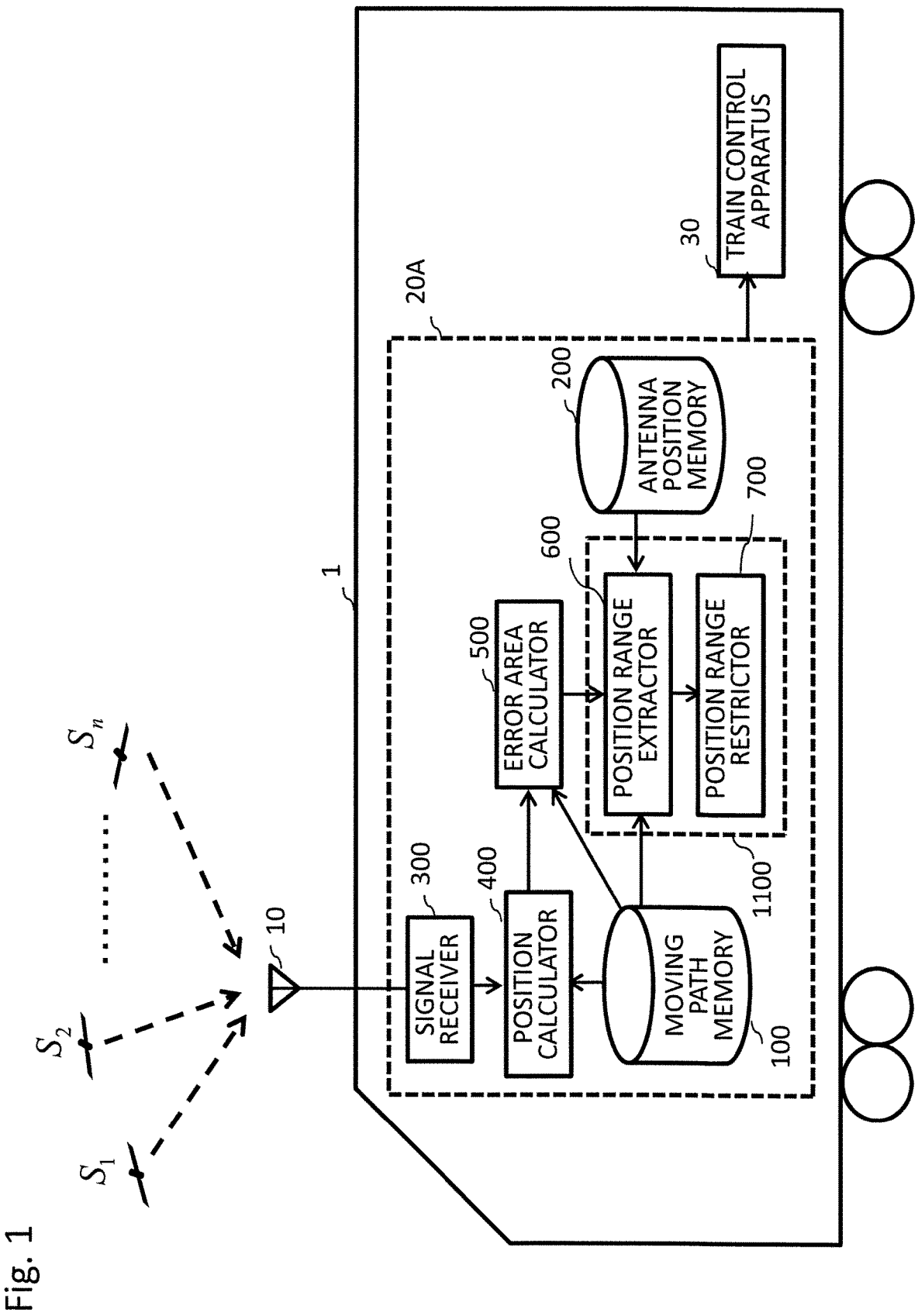
FIG. 1 is a diagram showing a satellite positioning apparatus and main peripheral components mounted on a train, according to a first embodiment of the present invention.

FIG. 1 is a diagram showing a satellite positioning apparatus 20A and main peripheral components mounted on a train 1, according to the first embodiment of the present invention.

Referring to FIG. 1, the train 1 is provided with: a receiving antenna 10 configured to receive satellite positioning signals; the satellite positioning apparatus 20A configured to calculate a position range of the train 1 based on the satellite positioning signals received through the receiving antenna 10; and a train control apparatus 30 configured to control a train speed and the like according to position range information.

Referring to FIG. 1, the receiving antenna 10 is installed at a predetermined position on the train 1, for example, on the top of the train 1, and receives radio waves of the satellite positioning signals emitted from positioning satellites $S_1$ to $S_n$ in the sky, to convert the radio waves to high-frequency signals.

The positioning satellites to be used are satellites of any satellite navigation systems that allow positioning of a signal receiving point by emitting satellite positioning signals with time information and the satellites' orbit information superimposed. The positioning satellites include, for example, GPS satellites, GLONASS satellites, Beidou satellites, QZSS satellites, and the like. From the viewpoint of improving availability of satellite positioning results and limiting a position range, the satellite positioning apparatus 20A is preferably configured to receive satellite positioning signals from satellites of a plurality of satellite navigation systems.

Referring to FIG. 1, the satellite positioning apparatus 20A determines the position range of the train 1, based on the satellite positioning signals received from the plurality of positioning satellites $S_1$ to $S_n$. The satellite positioning apparatus 20A is provided with: a moving path memory 100; an antenna position memory 200; a signal receiver 300; a position calculator 400; an error area calculator 500; and a position range determiner 1100. In addition, the position range determiner 1100 is provided with a position range extractor 600 and a position range restrictor 700.

The moving path memory 100 stores, in advance, three-dimensional information of a path through which the receiving antenna 10 travels as the moving path of the train 1 when the train 1 moves along the track.

The antenna position memory 200 stores, in advance, information on a size of the train 1 (in particular, a length from a head to a tail end), and an installed position of the receiving antenna 10 on the train 1.

The signal receiver 300 demodulates the satellite positioning signals received through the receiving antenna 10, and calculates navigation data and observation data. The signal receiver 300 outputs the navigation data and the observation data to the position calculator 400.

The position calculator 400 calculates measured positions and receiver clock errors, based on the navigation data and the observation data of the three positioning satellites having a predetermined relationship among their relative positions, among the navigation data and the observation data of the received satellite positioning signals, and based on the three-dimensional information of the path stored in the moving path memory 100. The measured positions indicate results of positioning the receiving antenna 10 as the position of the train 1. The receiver clock errors indicate errors among clocks of the positioning satellites from which the satellite positioning signals have been received, and a clock of the satellite positioning apparatus 20A. The position calculator 400 outputs the measured positions and the receiver clock errors to the error area calculator 500.

The error area calculator 500 sets a plurality of vector pairs, each of the vector pairs consisting of arbitrary two vectors perpendicular to each other on a plane satisfying a predetermined criterion, and calculates an error area indicating an area where the receiving antenna 10 may exist, based on the vectors, the measured positions, the receiver clock errors, and positions of the three positioning satellites used for positioning. In addition, the error area calculator 500 calculates at least two or more error areas by setting at least two or more vector pairs. The error area calculator 500 outputs the error areas to the position range extractor 600.

For each of the plurality of error areas corresponding to the plurality of vector pairs, the position range extractor 600 extracts a part of the moving path included in the error area, as a candidate position range corresponding to the error area. The position range extractor 600 extracts the candidate position ranges, based on the three-dimensional information of the path stored in the moving path memory 100, and based on the size of the train 1 and the installed position of the receiving antenna 10, that are stored in the antenna position memory 200. The position range extractor 600 outputs the candidate position ranges to the position range restrictor 700.

The position range restrictor 700 determines a common area of the plurality of candidate position ranges corresponding to the plurality of error areas, as the position range of the moving object. The position range restrictor 700 outputs the position range of the moving object, to the train control apparatus 30.

Hereinafter, the satellite positioning apparatus 20A according to the first embodiment will be described in more detail.

At first, the moving path memory 100 will be described. The three-dimensional information on the path through which the receiving antenna 10 travels when the train 1 moves along the track can be obtained, for example, by performing high precision positioning using a phase of a carrier wave of the positioning satellite, in advance. In addition, the three-dimensional information of the path can be obtained geometrically, for example, by using information on a series of coordinate of a pair of rails, and information on a height of the receiving antenna 10 with respect to the ground. Further, by applying an appropriate interpolation method, such as Lagrange interpolation, to the three-dimensional information of the path, the path can be represented by a curve C: r(t)=(x(t), y(t), z(t)), the curve C passing respective coordinate points. Further, the curve C can be represented by the curve C: r(s)=(x(s), y(s), z(s)), parameterized by a curve length "s" from the point 0 on the curve. In this case, by appropriately selecting a position of the point 0, it is possible to readily associate the position on the curve with a unit (kilometer) commonly used to represent a position along the track.

Figure 2:
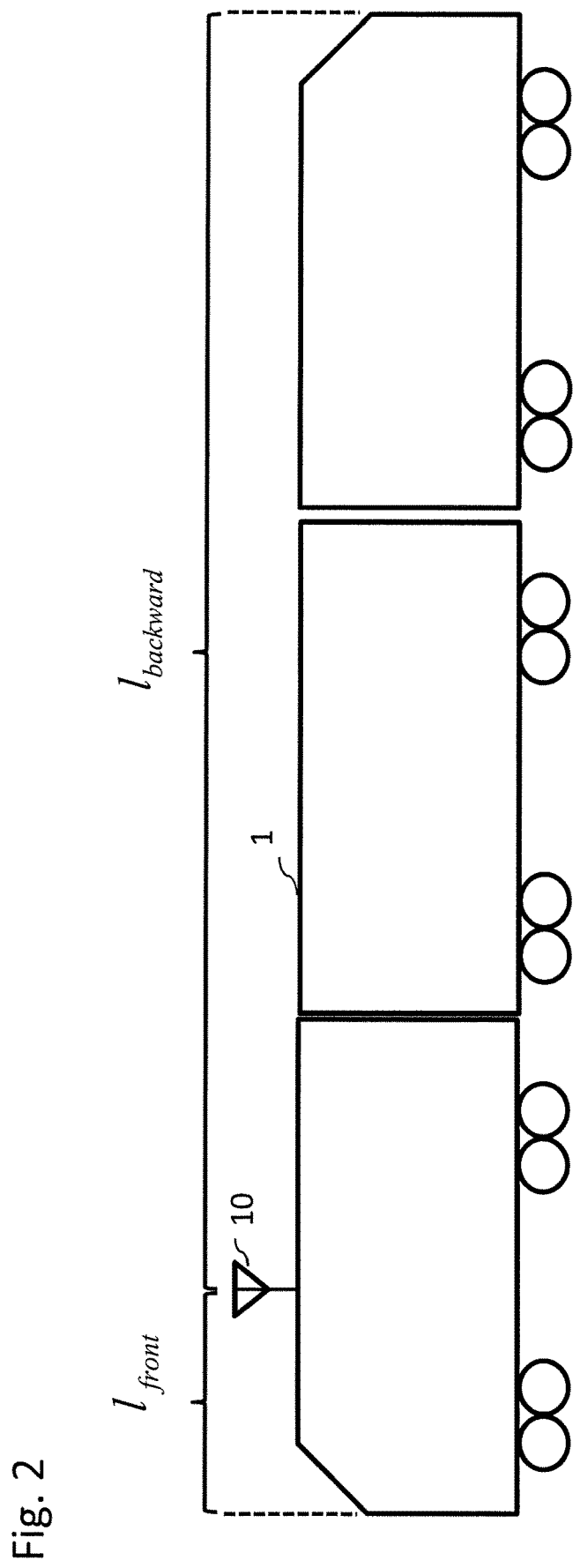
FIG. 2 is a diagram showing a relationship between a train length and an installed position of a receiving antenna, in relation to the satellite positioning apparatus according to the first embodiment of the present invention.

Next, the antenna position memory 200 will be described. FIG. 2 is a diagram showing a relationship between a length of the train 1 and an installed position of the receiving antenna 10, in relation to the satellite positioning apparatus 20A according to the first embodiment of the present invention.

Referring to FIG. 2, $l_{front}$ denotes a length from the installed position of the receiving antenna 10 to a head of the train 1, and $l_{backward}$ denotes a length from the installed position of the receiving antenna 10 to a tail end of the train 1.

Figure 3:
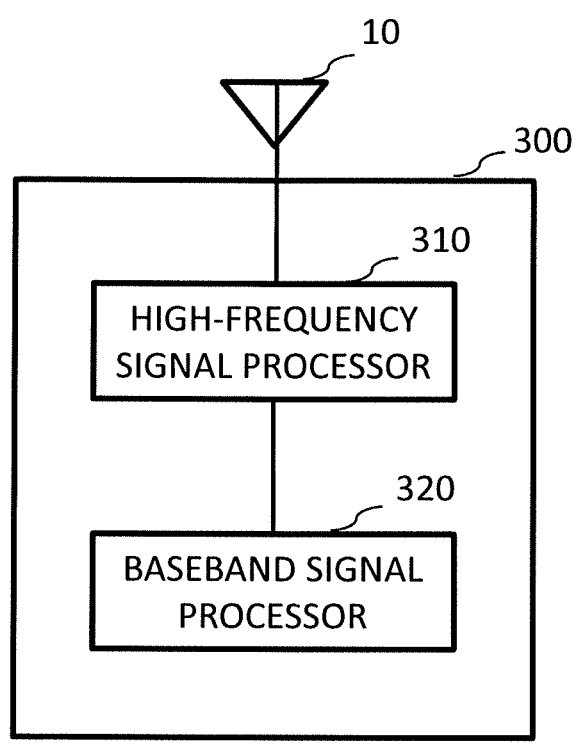
FIG. 3 is a diagram showing a configuration of a signal receiver in the satellite positioning apparatus according to the first embodiment of the present invention.

Next, the signal receiver 300 will be described. FIG. 3 is a diagram showing a configuration of the signal receiver 300 in the satellite positioning apparatus 20A according to the first embodiment of the present invention. The signal receiver 300 is connected to the receiving antenna 10, and is provided with a high-frequency signal processor 310 and a baseband signal processor 320. The high-frequency signal processor 310 performs processing of amplification, down-conversion, filtering, and analog/digital conversion on high-frequency signals outputted from the receiving antenna 10, to convert into a signal format that can be processed by the baseband signal processor 320. The baseband signal processor 320 performs signal acquisition processing, signal tracking processing, and navigation message demodulation processing on the signals outputted from the high-frequency signal processor 310, to obtain navigation data and observation data of the positioning satellites associated with the received satellite positioning signals. The navigation data is data indicating orbital positions of the positioning satellites associated with the received satellite positioning signals. The observation data is data indicating pseudo-ranges $l_1$ to $l_n$ between the positioning satellites associated with the received satellite positioning signals and the receiving antenna, and indicating a time $t_r$ when the satellite positioning signals are received. The time or time period for measuring the pseudo-ranges may be arbitrarily set, for example, measuring every second. The signal receiver 300 outputs the calculated navigation data and observation data to the position calculator 400. The position calculator 400 described later calculates the position of the receiving antenna 10 by using the satellite positioning signals received from at least three positioning satellites. Therefore, when only satellite positioning signals from two or less positioning satellites can be received, the signal receiver 300 outputs a signal indicating that the position range can not be measured, to the train control apparatus 30. When the signal receiver 300 receives the satellite positioning signals from three or more positioning satellites, the position calculator 400 processes those satellite positioning signals.

In order to reduce an initial time required to calculate the navigation data, the satellite positioning apparatus 20A may be configured to receive the latest navigation data from an external apparatus via a terrestrial wireless network.

Next, the position calculator 400 will be described. The position calculator 400 reads the curve r(s) of the moving path of the receiving antenna 10, from the moving path memory 100, and selects three positioning satellites satisfying a predetermined criterion, among the positioning satellites $S_1$ to $S_n$ from which the signal receiver 300 has received the satellite positioning signals. The position calculator 400 calculates the measured positions and the receiver clock errors by performing calculation for positioning based on the read moving path r(s), positions of the selected three positioning satellites based on the navigation data of the positioning satellites, and the pseudo-ranges based on the observation data of the selected three positioning satellites. The position calculator 400 outputs the measured positions and the receiver clock errors to the error area calculator 500.

Figure 4:
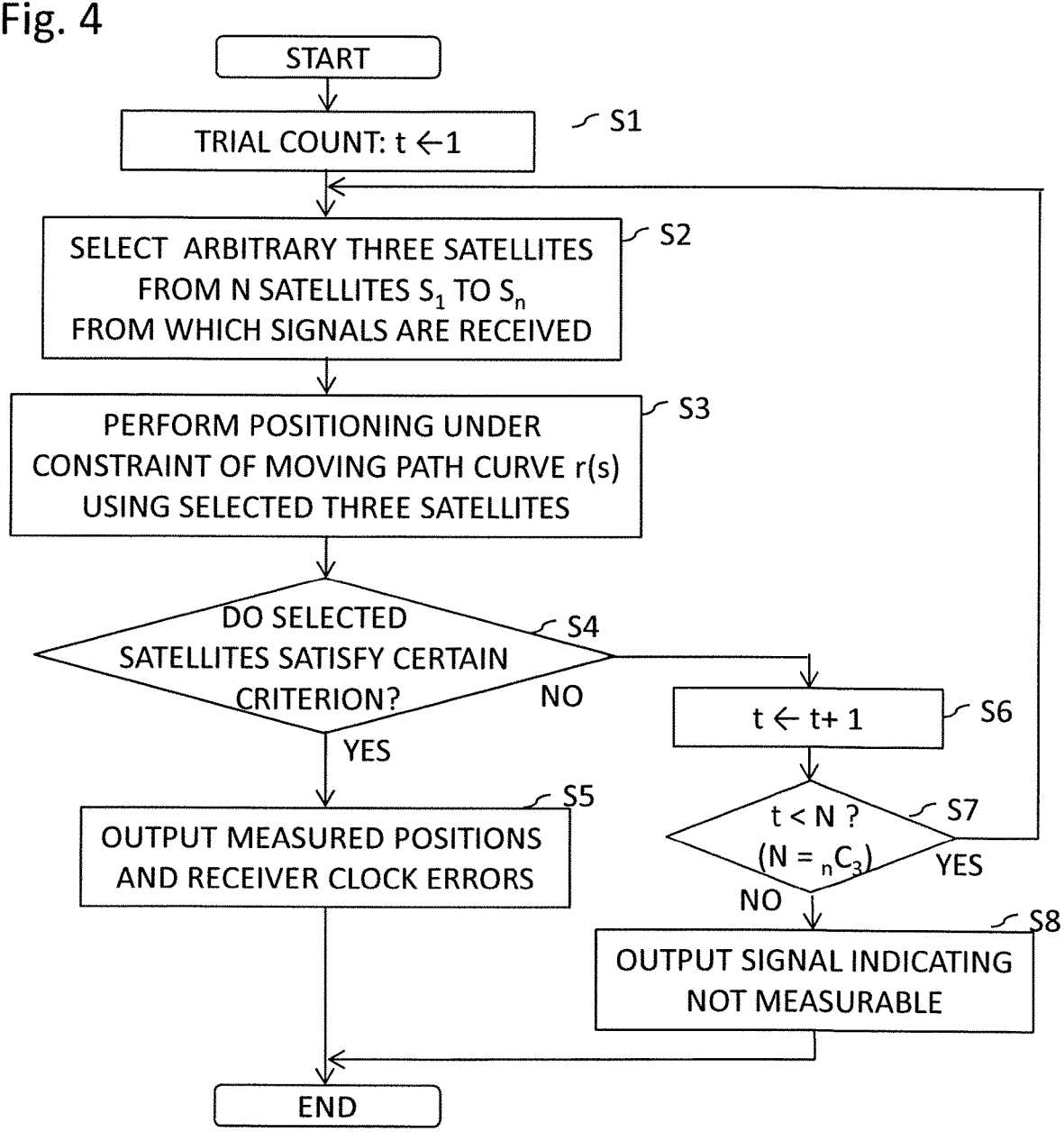
FIG. 4 is a flowchart showing an operation of a position calculator according to the first embodiment of the present invention.

FIG. 4 is a flowchart showing an operation of the position calculator 400 according to the first embodiment of the present invention. Hereinafter, the operation of the position calculator 400 will be described in accordance with the flowchart shown in FIG. 4.

At step S1, the position calculator 400 sets a trial count "t" as t=1.

At step S2, the position calculator 400 selects a set of arbitrary three positioning satellites, among the positioning satellites $S_1$ to $S_n$ from which the signal receiver 300 has received the satellite positioning signals. The three positioning satellites are not limited to positioning satellites of the same satellite navigation system. For example, one may be selected from GPS satellites, one may be selected from GLONASS satellites, and one may be selected from Beidou satellites. Since three positioning satellites are selected from the n positioning satellites, the positioning satellites may be selected in $N={}_nC_3$ ways.

At step S3, the position calculator 400 performs positioning using the three positioning satellites selected at step S2, and the position calculator 400 calculates the measured positions and the receiver clock errors, under a constraint that a solution is on the curve r(s) of the moving path.

Hereinafter, a method of calculating the measured positions and the receiver clock errors will be described. $(x_k, y_k, z_k)$ (k=1, 2, 3) denotes coordinates of the three positioning satellites $S_k$, which are read from the navigation data, $l_1, l_2, l_3$ denotes the pseudo-ranges of the three positioning satellites, which are read from the observation data, and $\delta b$ denotes the receiver clock error. In this case, an observation equation is represented by the following Mathematical Expressions 1 to 3.

$$l_1 = \sqrt{(x_1-x(s))^2+(y_1-y(s))^2+(z_1-z(s))^2}+\delta b \quad \text{[Mathematical Expression 1]}$$

$$l_2 = \sqrt{(x_2-x(s))^2+(y_2-y(s))^2+(z_2-z(s))^2}+\delta b \quad \text{[Mathematical Expression 2]}$$

$$l_3 = \sqrt{(x_3-x(s))^2+(y_3-y(s))^2+(z_3-z(s))^2}+\delta b \quad \text{[Mathematical Expression 3]}$$

By solving Mathematical Expressions 1 to 3 for unknowns "s" and "$\delta b$" using the least-squares method, measured position P (x(s), y(s), z(s)) and the receiver clock error $\delta b$ are obtained.

At step S4, the position calculator 400 determines whether or not the set of three positioning satellites selected at step S2 satisfy a predetermined positioning criterion. Hereinafter, the positioning criterion to be satisfied by the set of three positioning satellites will be described. This positioning criterion is a criterion on the constellation of three positioning satellites, which should be satisfied when the error area calculator 500 calculates the error area. When the criterion is not satisfied, the error area can not be calculated. "u" denotes a unit vector in a tangential direction of the moving path r(s) at the measured position P, "v" denotes a unit vector in a radial direction of a tangent circle of the moving path r(s) at the measured position P, "$g_k$" denotes a unit direction vector in a direction in which the measured position P is seen from each positioning satellite $S_k$ (k=1, 2, 3), and "i" denotes an imaginary unit. In this case, variables $f_k$, $h_k$, and $z_k$ are defined as follows.

$$f_k := g_k \cdot u$$

$$h_k := g_k \cdot v$$

$$z_k := f_k + ih_k$$

In this case, using $z_1 = z_4$, the positioning criterion is given as follows.

$$\text{Im}(z_k^* z_{k+1}) = f_k h_{k+1} - f_{k+1} h_k > 0$$

This positioning criterion indicates that when straight lines from the measured position P toward the three satellites are projected onto a plane "α" spanned by the vectors "u" and "v", the three satellites are not positioned only on one side of an arbitrary straight line on the plane "α", passing through the measured position P.

If the set of three positioning satellites satisfy this positioning criterion, the process proceeds to step S5, and if not, the process proceeds to step S6.

At step S5, the position calculator 400 outputs the measured position P and the receiver clock error $\delta b$ that are calculated at step S3, to the error area calculator 500, and terminates the processing of the position calculator. In this case, next, the error area calculator 500 performs its processing.

At step S6, the position calculator 400 increments the trial count "t" by one.

At step S7, the position calculator 400 determines whether or not the trial count "t" is smaller than a number N of combinations of the positioning satellites. That is, for all combinations of three positioning satellites selected from the n positioning satellites from which the satellite positioning signals have been received, it is determined whether or not the calculation of the measured positions and the receiver clock errors, and the determination of the positioning criterion have been done. If t>N, the process returns to step S2, and arbitrary three positioning satellites are reselected. In this case, the positioning satellites are to be selected so as not to reselect the previously selected combinations. If t=N, it is considered that the satellite positioning signals received at time $t_r$ does not satisfy the positioning criterion for all combinations of the positioning satellites. In this case, the process proceeds to step S8, and the position calculator 400 outputs a signal indicating that the position range can not be measured, to the train control apparatus 30, and terminates the processing of the position calculator 400.

Next, the error area calculator 500 will be described. The error area calculator 500 sets a plurality of vector pairs, each vector pair consisting of arbitrary two vectors perpendicular to each other on the plane "α" spanned by the vectors "u" and "v", and the error area calculator 500 calculates an error area for each of the plurality of vector pairs, based on the two vectors of the vector pair, the measured positions, the receiver clock errors, and the positions of the three positioning satellites used for positioning. Let (u', v') be a vector pair including arbitrary two vectors perpendicular to each other on the plane "α", variables $f_k'$ and $h_k'$ are defined as follows.

$$f_k' := g_k \cdot u'$$

$$h_k' := g_k \cdot v'$$

Then, assuming that a true value Q of a coordinate of the receiving antenna 10 exists on the plane "α", $\delta u'$ denotes a component of a positioning error in u'-direction, and δv' denotes a component of the positioning error in v'-direction. In this case, a magnification coefficient $M_{u'}$ in u'-direction and a magnification coefficient $M_{v'}$ in v'-direction are defined by the following Mathematical Expressions 4 and 5.

[Mathematical Expression 4]
$$M_{u'} := \frac{\max(|h'_2 - h'_3|, |h'_3 - h'_1|, |h'_1 - h'_2|)}{\min(|f'_2 h'_3 - f'_3 h'_2|, |f'_3 h'_1 - f'_1 h'_3|, |f'_1 h'_2 - f'_2 h'_1|)}$$

[Mathematical Expression 5]
$$M_{v'} := \frac{\max(|f'_2 - f'_3|, |f'_3 - f'_1|, |f'_1 - f'_2|)}{\min(|f'_2 h'_3 - f'_3 h'_2|, |f'_3 h'_1 - f'_1 h'_3|, |f'_1 h'_2 - f'_2 h'_1|)}$$

Two error inequalities in u'-direction and v'-direction hold as follows.

$|\delta u'| \leq M_{u'} |\delta b|$ $|\delta v'| \leq M_{v'} |\delta b|$

The right sides of these error inequalities are referred to as "upper limit error values".

Figure 5:
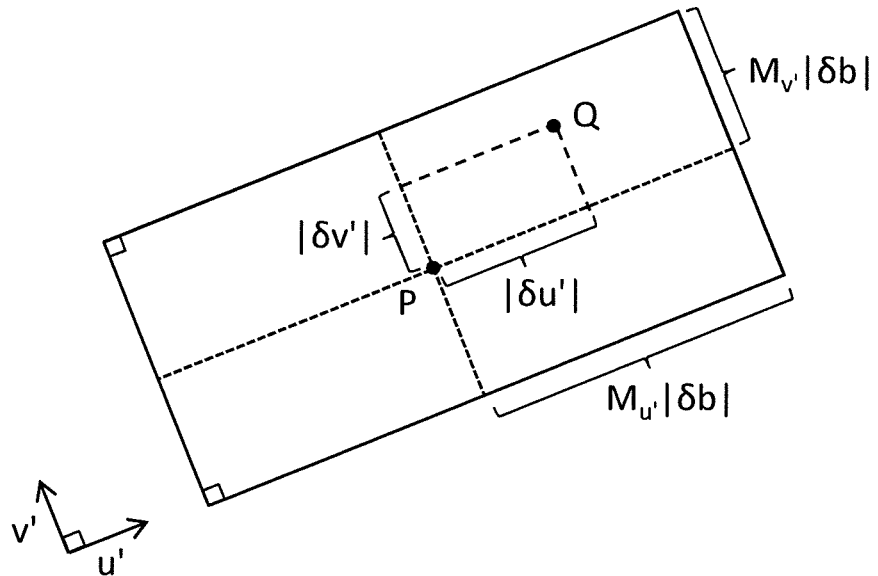
FIG. 5 is a diagram for illustrating an error area calculated by an error area calculator according to the first embodiment of the present invention.

FIG. 5 is a diagram for illustrating an error area calculated by the error area calculator 500 according to the first embodiment of the present invention. The error area is a rectangular area centered at the measured position P and having sides along two vectors u' and v' of a vector pair corresponding to the error area. As can be seen from the definitions of the variables $f_k'$ and $h_k'$, lengths of the sides of the error area depend on angles among vectors $g_k$ toward the measured position P from the positions of the three positioning satellites used for positioning of the receiving antenna 10, and the two vectors u' and v' of the vector pair corresponding to the error area. The lengths of the sides of the error area also depend on the receiver clock error δb. The length of one side of the error area is twice as large as the upper limit error value.

Figure 6:
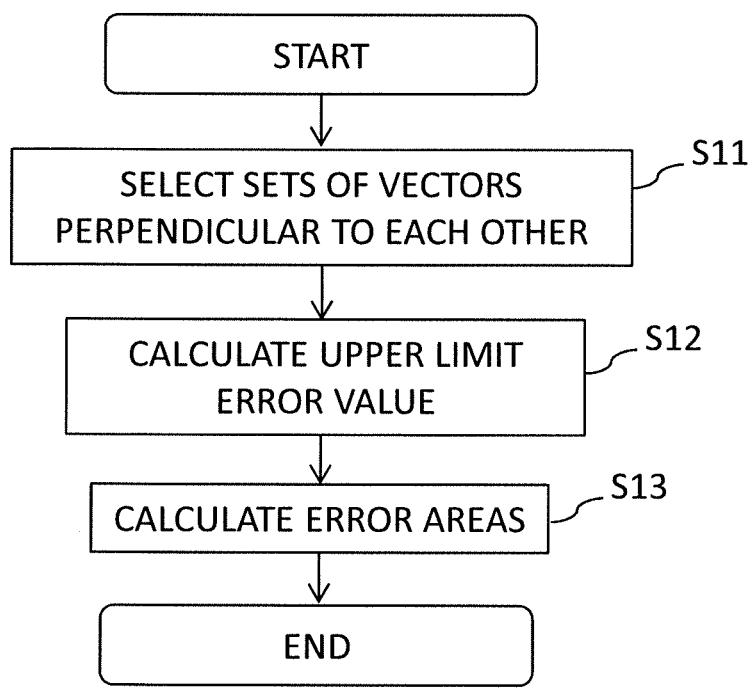
FIG. 6 is a flowchart showing an operation of the error area calculator according to the first embodiment of the present invention.

FIG. 6 is a flowchart showing an operation of the error area calculator 500 according to the first embodiment of the present invention. Next, the operation of the error area calculator 500 will be described in accordance with the flowchart shown in FIG. 6.

At step S11, when M is an integer of 2 or more, the error area calculator 500 selects M vector pairs, each of the vector pairs consisting of two vectors perpendicular to each other on the plane "α".

Figure 7A:
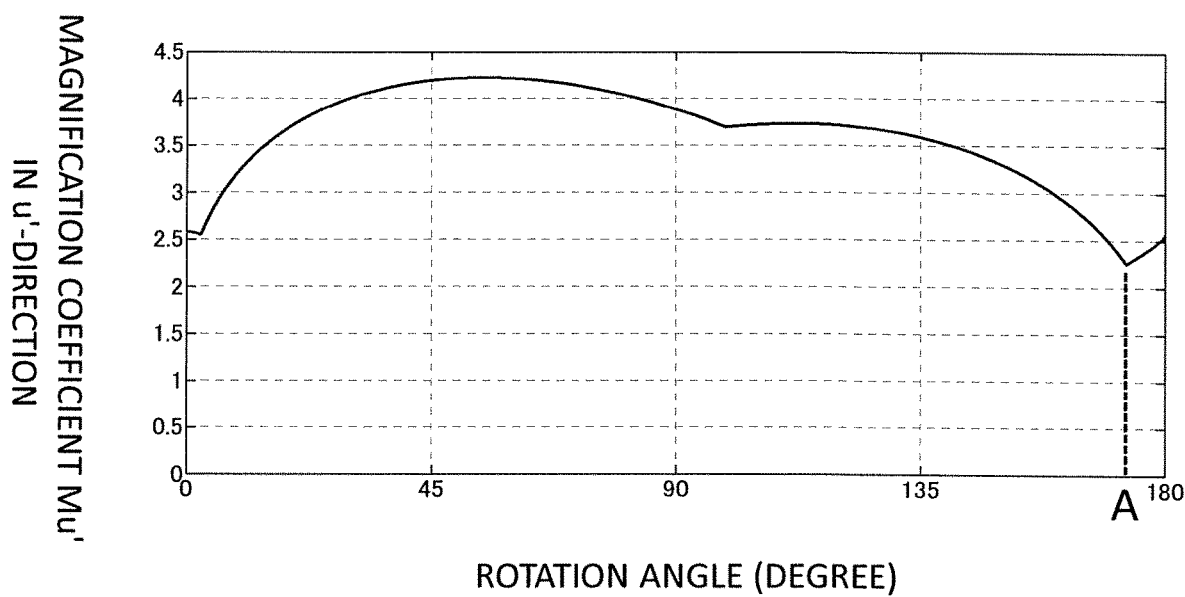
FIG. 7A is a graph showing a magnification coefficient in u'-direction calculated by the error area calculator according to the first embodiment of the present invention.
Figure 7B:
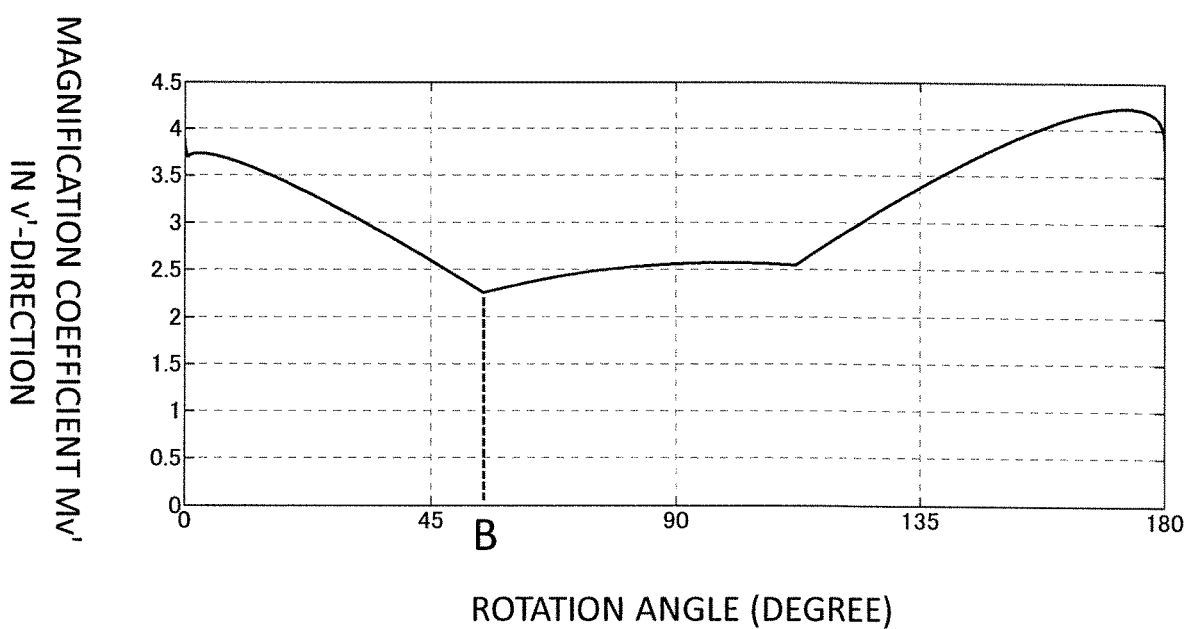
FIG. 7B is a graph showing a magnification coefficient in v'-direction calculated by the error area calculator according to the first embodiment of the present invention.

There is no restriction on a method of selecting perpendicular vector pairs, but from the viewpoint of limiting the error area, for example, a pair providing the smallest magnification coefficients may be selected. Hereinafter, a specific example will be explained. The plane "α" is assumed to be a ground plane at a point of latitude 34.759 degrees and longitude 135.42 degrees. From the GPS satellites in the sky at 15:00 on Jul. 16, 2015 (Japan time), three positioning satellites of satellite numbers PRN 19, PRN 30, and PRN 32 are selected. For these positioning satellites, FIGS. 7A and 7B respectively show changes of the magnification coefficient l in u'-direction and the magnification coefficient $M_{v'}$ in v'-direction, when rotating the vector pair (u', v') consisting of two vectors perpendicular to each other on the plane "α". A horizontal axis of each graph indicates a rotation angle of the vector pair. Referring to FIG. 7A, the magnification coefficient $M_{u'}$ in u'-direction is minimized at a rotation angle A. Referring to FIG. 7B, the magnification coefficient $M_{v'}$ in v'-direction is minimized at a rotation angle B. Each of the plurality of vector pairs may be selected such that the magnification coefficients $M_{u'}$ and $M_{v'}$ become the minimum value or its neighborhood, and thus, such that the lengths of the sides of the error area corresponding to the vector pair becomes the minimum value or its neighborhood. In addition, when sufficient calculation resources are available, for example, vector pairs at constant angle intervals may be automatically selected.

Each of the selected M vector pairs is referred to as an m-th (m=1, 2, . . . , M) vector pair. In addition, a set of magnification coefficients obtained for the m-th vector pair is referred to as m-th magnification coefficients.

At step S12, the error area calculator 500 calculates an m-th upper limit error value for the m-th vector pair selected at step S11, by multiplying the m-th magnification coefficients by an absolute value |δb| of the receiver clock error.

At step S13, the error area calculator 500 calculates an m-th error area from the measured positions and the m-th upper limit error value, and terminates the processing of the error area calculator 500.

Next, the position range extractor 600 will be described. The position range extractor 600 reads the moving path r(s) from the moving path memory 100, and calculates an m-th candidate position range for the m-th error area calculated by the error area calculator 500.

Figure 8:
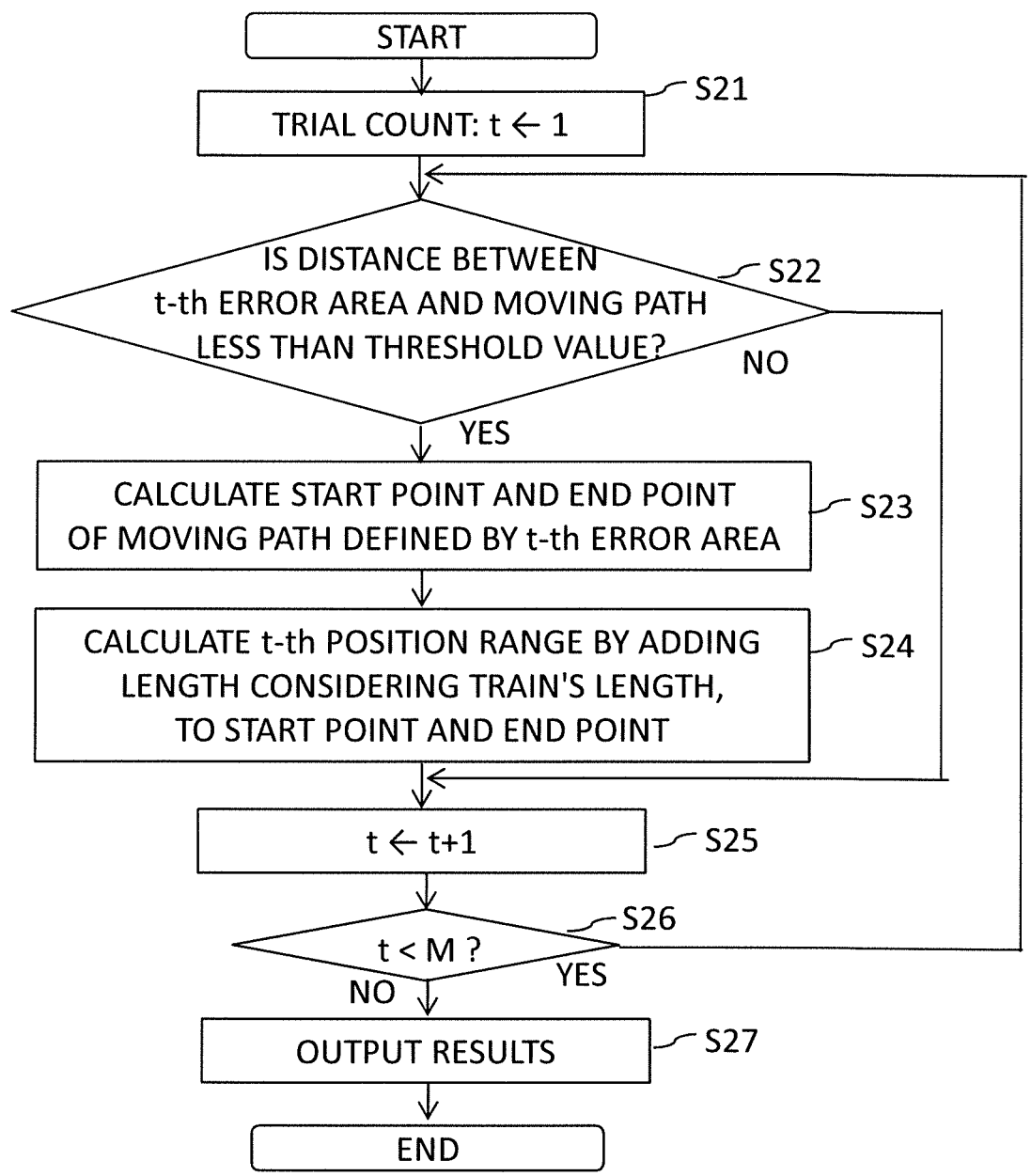
FIG. 8 is a flowchart showing an operation of a position range extractor according to the first embodiment of the present invention.

FIG. 8 is a flowchart showing an operation of the position range extractor according to the first embodiment of the present invention. Hereinafter, the operation of the position range extractor 600 will be described in accordance with the flowchart shown in FIG. 8.

At step S21, the position range extractor 600 sets the trial count t=1.

At step S22, the position range extractor 600 determines whether or not a distance between a t-th error area and the moving path r(s) is less than a threshold value. A determination method at step S22 is described as follows. A perpendicular line AB to the plane "α" is given, the perpendicular line AB passing through an arbitrary point A on the moving path r(s), and a point B existing within the t-th error area. The perpendicular line AB has a length "h". For any such points A and B, the length "h" of the perpendicular line AB is compared with a predetermined threshold value K.

Figure 9:
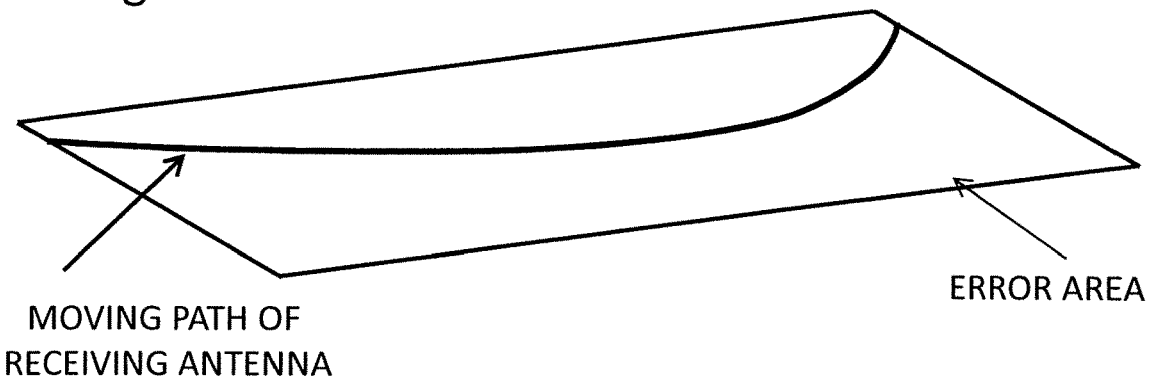
FIG. 9 is a diagram showing a case in which a distance between an error area and a moving path is less than a threshold value, in relation to the position range extractor according to the first embodiment of the present invention.

FIG. 9 shows a case in which a distance between the error area and the moving path is less than a threshold value. In the range of the error area, the moving path r(s) exists on the plane "α". In this case, since the true value Q of the position of the receiving antenna 10 can be considered to exist on the plane "α", the t-th error area is determined to be reliable, and a t-th candidate position range is calculated at steps S23 and S24.

Figure 10:
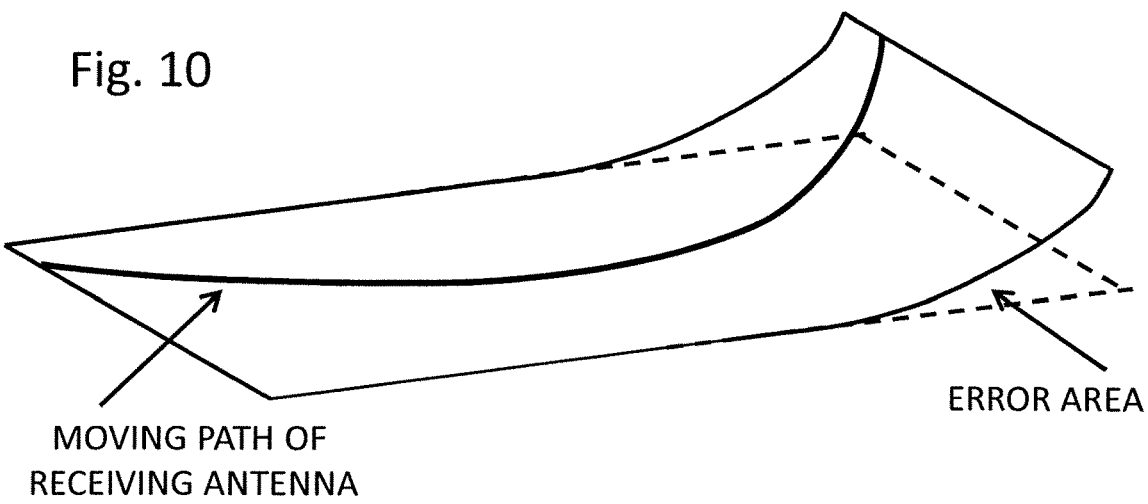
FIG. 10 is a diagram showing a case in which the distance between the error area and the moving path exceeds the threshold value, in relation to the position range extractor according to the first embodiment of the present invention.

FIG. 10 shows a case in which the distance between the error area and the moving path exceeds the threshold value. In the range of the error area, the moving path r(s) protrudes from the plane "α". In this case, since there is a possibility that the true value Q of the position of the receiving antenna 10 does not exist on the plane "α", a t-th upper limit error value is determined not to be reliable, and the process proceeds to step S25.

Figure 11:
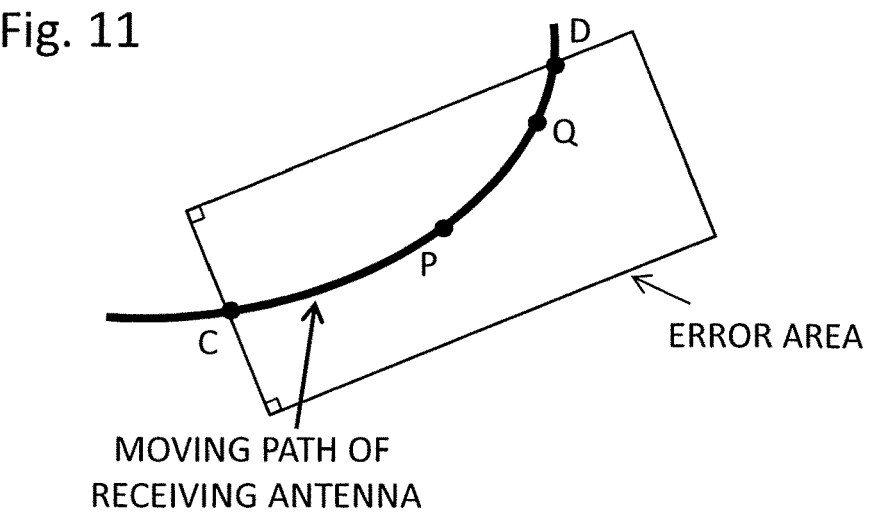
FIG. 11 is a diagram showing the error area, the moving path, and intersection points of the error area and the moving path, in relation to the position range extractor according to the first embodiment of the present invention.

At step S23, the position range extractor 600 extracts the moving path r(s) existing within the t-th error area, and calculates an intersection point $s=ls_m$ on the tail end of the train 1, and an intersection point $s=lg_m$ on the head of the train 1. FIG. 11 is a diagram showing the error area, the moving path r(s), an intersection point C on the tail end of the train 1, and an intersection point D on the head of the train 1.

At step S24, the position range extractor 600 calculates the t-th candidate position range based on the intersection points calculated at step S23, and based on the installed position of the receiving antenna 10 read out from the antenna position memory 200. In this case, the candidate position range can be determined with a start point of "$ls_m - l_{backward}$", and an end point of "$lg_m + l_{backward}$".

At step S25, the position range extractor 600 increments the trial count "t" by one.

At step S26, the position range extractor 600 determines whether or not the trial count "t" is larger than the number M of vector pairs selected by the error area calculator 500. That is, it is determined whether or not the candidate position ranges have been extracted for all the error areas. If t<M, the process returns to step S22. If t=M, the position range extractor 600 outputs results at step S27.

A method of outputting the extracted results of the candidate position ranges will be described. If no candidate position range has not been calculated, that is, if all the distances between the error areas and the moving path r(s) are equal to or larger than the threshold value at step S22, the position range extractor 600 outputs a signal indicating that the position range can not be measured, to the train control apparatus 30. If at least one candidate position range has been calculated, the position range extractor 600 outputs the results to the position range restrictor 700.

Next, an operation of the position range restrictor 700 will be described. The position range restrictor 700 extracts a common area of all candidate position ranges that have been outputted by the position range extractor 600, and outputs the common area as the position range of the receiving antenna 10, to the train control apparatus 30. When the position range extractor outputs only one candidate position range, the position range restrictor 700 simply outputs the extracted candidate position range as the position range of the receiving antenna 10, to the train control apparatus 30.

A modified embodiment of the satellite positioning apparatus 20A according to the first embodiment will be described. In the above description, the position calculator 400 of the satellite positioning apparatus 20A determines measured positions and receiver clock errors for a set of positioning satellites satisfying the positioning criterion, and performs subsequent processing based on only such measured positions and receiver clock errors. However, the position calculator 400 may determines a plurality sets of measured positions and receiver clock errors for a plurality sets of positioning satellites satisfying the positioning criterion, respectively, and performs subsequent processing based on the plurality sets of measured positions and receiver clock errors.

An operation in this case will be described. At first, the position calculator 400 sets a plurality of sets of positioning satellites, each set including three positioning satellites satisfying the positioning criterion, and each set being referred to as a f-th combination of positioning satellites (f=1, 2, . . . , N). The position calculator 400 outputs measured positions and receiver clock errors for the first to N-th combinations of positioning satellites, respectively. The error area calculator 500 outputs first to M-th error areas for the first to N-th combinations of positioning satellites. The position range extractor 600 outputs first to M-th candidate position ranges for the first to the N-th combinations of positioning satellites. The position range restrictor 700 extracts a common area of all candidate position ranges outputted by the position range extractor 600, and outputs the common area as the position range of the receiving antenna 10, to the train control apparatus 30.

According to the satellite positioning apparatus 20A of the first embodiment described above, the satellite positioning apparatus 20A is configured as follows. The moving path memory 100 stores the moving path of the train 1 in advance. The signal receiver 300 receives the satellite positioning signals through the receiving antenna 10 mounted at a predetermined position on the train 1. The position calculator 400 calculates measured positions and receiver clock errors, based on satellite positioning signals received from three positioning satellites having a predetermined relationship among their relative positions, and based on the moving path, the measured positions indicating results of positioning the train 1, and the receiver clock errors indicating errors among clocks of the positioning satellites and a clock of the satellite positioning apparatus. The error area calculator 500 sets a plurality of vector pairs, each of the vector pairs consisting of arbitrary two vectors perpendicular to each other on a plane spanned by a tangent vector and a radial vector of a tangent circle of the moving path at the measured positions. Then, for each of the plurality of vector pairs, the error area calculator 500 calculates an error area indicating an area on the plane in which the train 1 may exist, based on the measured positions, the receiver clock errors, and positions of the three positioning satellites used for positioning the train 1. Thus, the error area calculator 500 calculates a plurality of error areas corresponding to the plurality of vector pairs. For each of the plurality of error areas corresponding to the plurality of vector pairs, the position range extractor 600 extracts a part of the moving path included in the error area, as a candidate position range corresponding to the error area. Thus, the position range extractor 600 extracts a plurality of candidate position ranges corresponding to the plurality of error areas. The position range restrictor 700 determines a common area of the plurality of candidate position ranges corresponding to the plurality of error areas, as the position range of the train 1.

According to the satellite positioning apparatus 20A of the first embodiment, it is possible to determine an accurate and limited position range of a moving object based on the satellite positioning signals received from the plurality of positioning satellites.

The error area calculator 500 does not use predetermined magnitudes of error for various factors of error, but calculates the error area every time. Therefore, even when an unexpected multipath wave occurs, it is possible to calculate an error area certainly including a true value of the position.

Therefore, the satellite positioning apparatus 20A according to the first embodiment can accurately determine the position range, even when the train is moving along a path with a large change in curvature that can not be approximated by a circle.

Since the position range extractor 600 determines that the distance between the error area and the moving path is less than a predetermined threshold value, there is an advantageous effect of increasing reliability of the position range.

Since the position range restrictor 700 limits the position range of the train 1, it is possible to more frequently run the trains 1.

Further, according to the satellite positioning apparatus 20A of the first embodiment, the error area calculator 500 sets a vector pair consisting of arbitrary two vectors perpendicular to each other, without being limited to a pair of vectors in a tangential direction and a radial direction of a tangent circle at the measured positions. Therefore, it is possible to limit the error area regardless of the constellation of the positioning satellites.

According to the conventional method described in Non-Patent Document 1, since the track is approximated by the tangent circle when calculating the position range, there is a problem that the position range can not be accurately obtained when moving along a track with a large change in curvature that can not be approximated by a circle. On the other hand, according to the satellite positioning apparatus 20A of the first embodiment, it is possible to limit the error area regardless of the constellation of the positioning satellites.

According to the satellite positioning apparatus 20A of the first embodiment, the position range determiner 1100 is configured to include the position range extractor 600 and the position range restrictor 700, but not limited thereto. The position range determiner 1100 may determine the position range of the moving object based on the plurality of error areas and the moving path. The position range determiner 1100 may be configured to determine a common area of the plurality of error areas and moving path as the position range of the moving object, by extracting the common area of the plurality of error areas, and then determining a part of the moving path included in the extracted common area, as the position range.

Second Embodiment

The satellite positioning apparatus 20A of the first embodiment is configured to calculate the position range of the train 1 based on only the received satellite positioning signals. On the other hand, a satellite positioning apparatus 20B according to a second embodiment is configured to further use a device for measuring a moving distance of the train, thus being capable of reliably calculating a position range of a train 1, even under a degraded receiving environment of satellite positioning signals, e.g., when the train is running through a tunnel.

Figure 12:
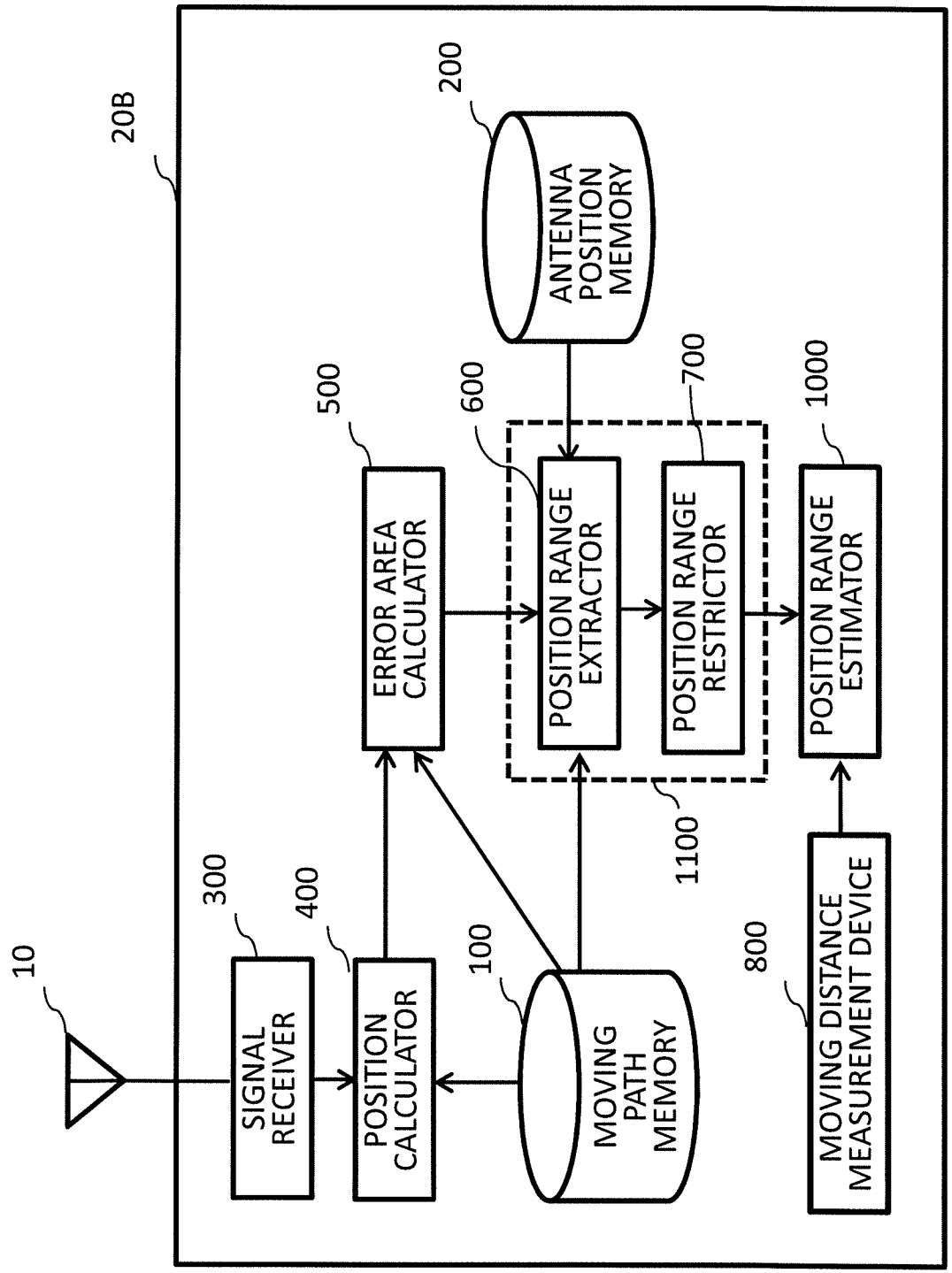
FIG. 12 is a diagram showing a configuration of a satellite positioning apparatus according to a second embodiment of the present invention.

FIG. 12 is a diagram showing a configuration of the satellite positioning apparatus 20B according to the second embodiment of the present invention. The satellite positioning apparatus 20B of the second embodiment and the satellite positioning apparatus 20A of the first embodiment shown in FIG. 1 are different in the following two points. A first difference is that the satellite positioning apparatus 20B according to the second embodiment is provided with a moving distance measurement device 800. A second difference is that the satellite positioning apparatus 20B of the second embodiment is provided with a position range estimator 1000. Hereinafter, the same reference numerals are given to similar components to those of the satellite positioning apparatus 20A shown in FIG. 1, and their description will be omitted.

At first, the moving distance measurement device 800 will be described. The moving distance measurement device 800 calculates a distance L that the train 1 has moved from a reference time $t_{ref}$ to a current time $t_{now}$, as follows.

$$L = \int_{t_{ref}}^{t_{now}} v(\tau) \cdot d\tau \pm d \quad \text{[Mathematical Expression 6]}$$

Where, $v(\tau)$ denotes a speed of the train 1 obtained without relying on satellite positioning signals, and "d" denotes a magnitude of error to be added to a distance measurement result. The speed of the train is measured using, for example, a tachogenerator (not shown) attached to an axle. The speed of the train is calculated by obtaining a wheel's rotation speed by the tachogenerator, and multiplying the wheel's rotation speed by a circumference of the wheel. The reference time $t_{ref}$ is a time calculated by the position range estimator 1000 to be described later. In addition, the moving distance measurement device 800 stores a reference position $P_{ref}$, i.e., a reference for the moving distance. The reference position $P_{ref}$ is a position calculated by the position range estimator 1000 to be described later. The moving distance measurement device 800 outputs the distance L that the train 1 has moved, to the position range estimator 1000.

In addition, the position range restrictor 700 outputs the position range of the train 1 calculated from the satellite positioning signals in a manner similar to that of the first embodiment, to the position range estimator 1000.

The position range estimator 1000 compares the position range of the train 1 calculated from the satellite positioning signals, with a predetermined threshold value. When a size of the position range of the train 1 calculated from the satellite positioning signals exceeds the threshold value (that is, when a sufficiently accurate position range of the train 1 is not calculated from the satellite positioning signals), the position range estimator 1000 calculates the position range of the train 1 based on the distance L outputted from the moving distance measurement device 800. In this case, a section from a start point "$P_{ref}+L-d$" to an end point "$P_{ref}+L+d$" is calculated as the position range of the train 1. The position range estimator 1000 outputs the position range of the train 1 calculated from the distance L, to the train control apparatus 30. On the other hand, when the size of the position range of the train 1 calculated from the satellite positioning signals is equal to or less than the threshold value (that is, when a sufficiently accurate position range of the train 1 is calculated from the satellite positioning signals), the position range estimator 1000 outputs the position range of the train 1 calculated from the satellite positioning signals, to the train control apparatus 30. Then, the position range estimator 1000 updates the reference time $t_{ref}$ with a current time, and updates the reference position $P_{ref}$ with a point within the current position range, to output them to the moving distance measurement device 800.

According to the satellite positioning apparatus 20B of the second embodiment described above, the moving distance measurement device 800 measures a distance that the train 1 has moved from the reference time $t_{ref}$ to the current time $t_{now}$. In addition, the position range estimator 1000 outputs one of the position range of the train 1 calculated from the satellite positioning signals, and the position range of the train 1 calculated from the distance L, to the train control apparatus 30. Therefore, even under a degraded receiving environment of satellite positioning signals, e.g., when the train is running through a tunnel, it is possible to reliably calculate the position range of the train 1. In addition, the satellite positioning apparatus 20B according to the second embodiment also has similar advantageous effects to those described in the first embodiment.

Third Embodiment

The satellite positioning apparatus 20B of the second embodiment is configured to determine, as the position range of the train 1, one of the position range of the train 1 calculated from satellite positioning signals, and the position range of the train 1 calculated from the distance L. On the other hand, a satellite positioning apparatus 20C of a third embodiment is configured to determine, as the position range of the train 1, an overlapping portion of a position range of the train 1 calculated from the satellite positioning signals, and a position range of the train 1 calculated from the distance L, thus being capable of further limiting the position range of a train 1.

Figure 13:
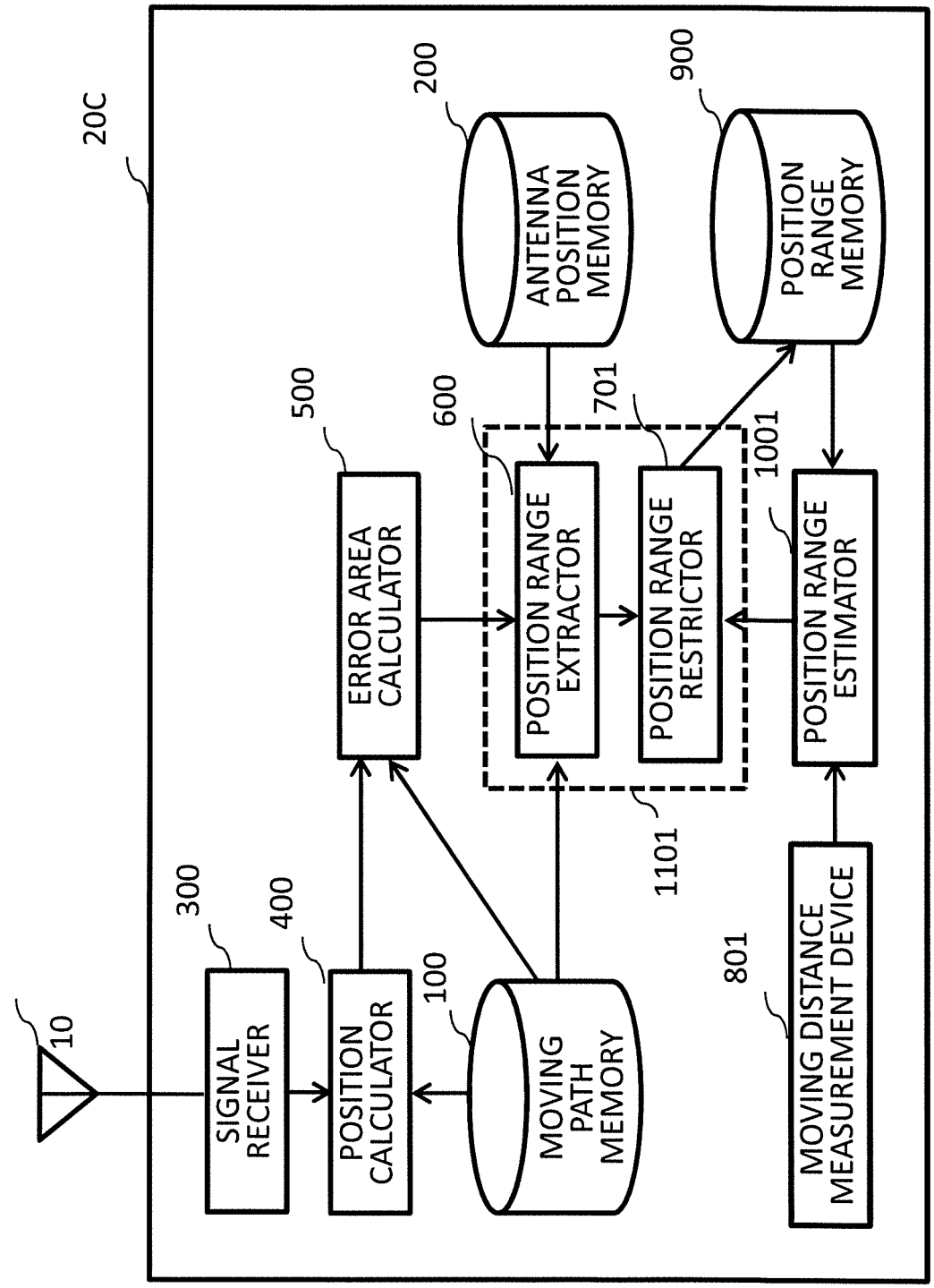
FIG. 13 is a diagram showing a configuration of a satellite positioning apparatus according to a third embodiment of the present invention.

FIG. 13 is a diagram showing a configuration of the satellite positioning apparatus 20C according to the third embodiment of the present invention. The satellite positioning apparatus 20C of the third embodiment and the satellite positioning apparatus 20B of the second embodiment shown in FIG. 12 are different in the following four points. A first difference is that the satellite positioning apparatus 20C of the third embodiment is provided with a position range memory 900. A second difference is that, instead of the position range determiner 1100 shown in FIG. 12, there is provided a position range determiner 1101 including the position range extractor 600 and a position range restrictor 701, and an operation of the position range restrictor 701 shown in FIG. 13 is different from the operation of the position range restrictor 700 shown in FIG. 12. A third difference is that an operation of a moving distance measurement device 801 shown in FIG. 13 is different from the operation of the moving distance measurement device 800 shown in FIG. 12. A fourth difference is that an operation of a position range estimator 1001 shown in FIG. 13 is different from the operation of the position range estimator 1000 shown in FIG. 12. Hereinafter, the same reference numerals are given to similar components to those of the satellite positioning apparatus 20B shown in FIG. 12, and their description will be omitted.

At first, the moving distance measurement device 801 will be described. The moving distance measurement device 801 calculates a distance L that the train 1 has moved from a first time $t_{before}$ when satellite positioning signals are received, to a second time $t_{now}$ when satellite positioning signals are received after the first time, as follows.

$$L = \int_{t_{before}}^{t_{now}} v(\tau) \cdot d\tau \pm d \qquad \text{[Mathematical Expression 7]}$$

Where, $v(\tau)$ denotes a speed of the train 1 obtained without relying on satellite positioning signals, and "d" denotes a magnitude of error to be added to a distance measurement result.

The first time $t_{before}$ is not necessarily an immediately preceding time of receiving the satellite positioning signals. For example, when the signal receiver 300 calculates pseudo-ranges every second, the first time $t_{before}$ may be a time before the second time $t_{now}$ by five or ten seconds.

Next, the position range memory 900 will be described. The position range memory 900 stores the position range of the train. 1 calculated from the satellite positioning signals after the first time $t_{before}$ and outputted by the position range restrictor 701.

Next, the position range estimator 1001 will be described. The position range estimator 1001 calculates an estimated position range of the train 1 at the second time $t_{now}$, by reading the position range of the train 1 at the first time $t_{before}$, from the position range memory 900, and adding the moving distance outputted by the moving distance measurement device 801. The position range estimator 1001 outputs the estimated position range to the position range restrictor 701. For example, the position range of the train 1 at the first time $t_{before}$ is represented by a start point $s=l_{st}$ and an end point $s=l_{go}$. Let a moving distance from the first time $t_{before}$ to the second time $t_{now}$ to be "l±d". In this case, the calculated estimated position range is represented by a start point "$l_{st}+l-d$" and an end point "$l_{go}+l+d$".

Finally, the position range restrictor 701 will be described. The position range restrictor 701 extracts a common area of all candidate position ranges outputted by the position range extractor 600, and the estimated position range outputted by the position range estimator 1001, to determine the common area as the position range of the train 1. The position range restrictor 701 outputs the position range of the train 1 to the train control apparatus 30. When the signal receiver 300, the position calculator 400, or the position range extractor 600 outputs a signal indicating that the position range can not be measured, the position range restrictor 701 simply outputs the estimated position range to the train control apparatus 30.

According to the satellite positioning apparatus 20C of the third embodiment described above, the moving distance measurement device 801 measures a distance that the train 1 has moved between the first time $t_{before}$ and the second time $t_{now}$. In addition, the position range memory 900 stores the position range after the first time $t_{before}$. In addition, the position range estimator 1001 calculates the estimated position range, by reading the position range at the first time $t_{before}$ from the position range memory 900, and adding the moving distance of the train 1 from the time $t_{before}$ to the time $t_{now}$, which has been measured by the moving distance measurement device 801.

Therefore, according to the third embodiment, it is possible to further limit the position range of the train 1 as compared with the case of the first and second embodiments. In addition, the satellite positioning apparatus 20C according to the third embodiment also has similar advantageous effects to those described in the first embodiment and the second embodiment.

Fourth Embodiment

The satellite positioning apparatus 20A of the first embodiment, the satellite positioning apparatus 20B of the second embodiment, and the satellite positioning apparatus 20C of the third embodiment are configured to calculate the position range of the train 1 based on the satellite positioning signals received through one receiving antenna 10 mounted on the train 1. On the other hand, a satellite positioning apparatus 20D of a fourth embodiment calculates a position range of a train according to signals from a plurality of receiving antennas mounted on the train, thus further limiting a position range.

Figure 14:
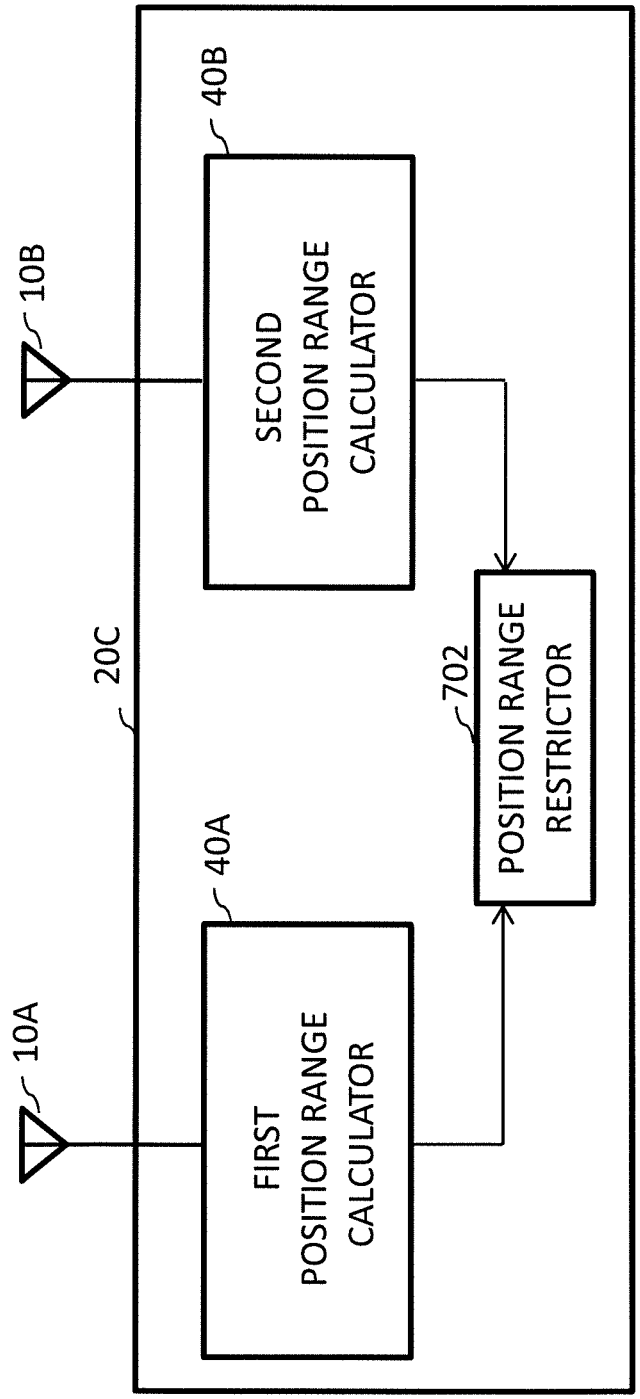
FIG. 14 is a diagram showing a configuration of a satellite positioning apparatus according to a fourth embodiment of the present invention.

FIG. 14 is a diagram showing a configuration of a satellite positioning apparatus according to the fourth embodiment of the present invention. Referring to FIG. 14, the satellite positioning apparatus 20D is provided with: two existing range calculators, i.e., a first position range calculator 40A and a second position range calculator 40B; and one position range restrictor 702. In addition, referring to FIG. 14, the first position range calculator 40A is connected to a first receiving antenna 10A, and the second position range calculator 40B is connected to a second receiving antenna 10B. In addition, both the first position range calculator 40A and the second position range calculator 40B operate according to a common clock (not shown), and output data of satellite positioning signals received at the same time $t_r$. The position range restrictor 702 outputs, as the position range of the satellite positioning apparatus 20D, a common area among all candidate position ranges outputted by the first position range calculator 40A, and candidate position ranges outputted by the second position range calculator 40B.

Figure 15:
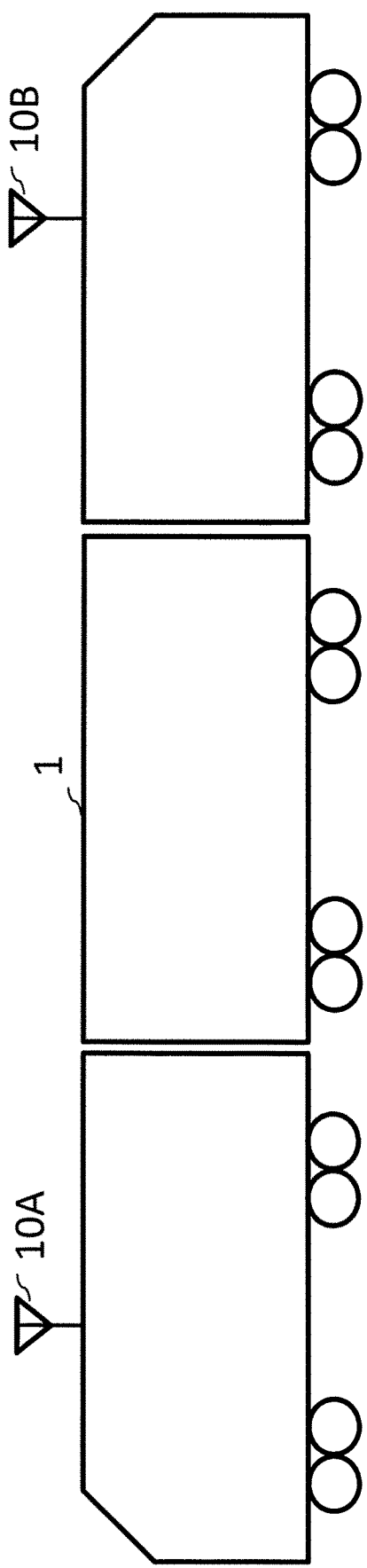
FIG. 15 is a diagram showing an exemplary installation of receiving antennas connected to the satellite positioning apparatus according to the fourth embodiment of the present invention.

FIG. 15 is a diagram showing an exemplary installation of the receiving antennas connected to the satellite positioning apparatus according to the fourth embodiment of the present invention. From the viewpoint of further limiting the position range of a train 1, it is desirable to receive radio waves of different conditions by installing the first receiving antenna 10A and the second receiving antenna 10B on the train 1 at positions as far as possible from each other.

Referring to FIG. 15, the first receiving antenna 10A and the second receiving antenna 10B are installed at a leading vehicle and a tail vehicle of the train 1 consisting of three vehicles, respectively. The train 1 of FIG. 15 is provided with the two receiving antennas, i.e., the first receiving antenna 10A and the second receiving antenna 10B, but not limited thereto, and three or more receiving antennas may be provided to a plurality of predetermined different positions on the train 1, respectively. In this case, the number of position range calculators increases depending on the number of the receiving antennas.

Figure 16:
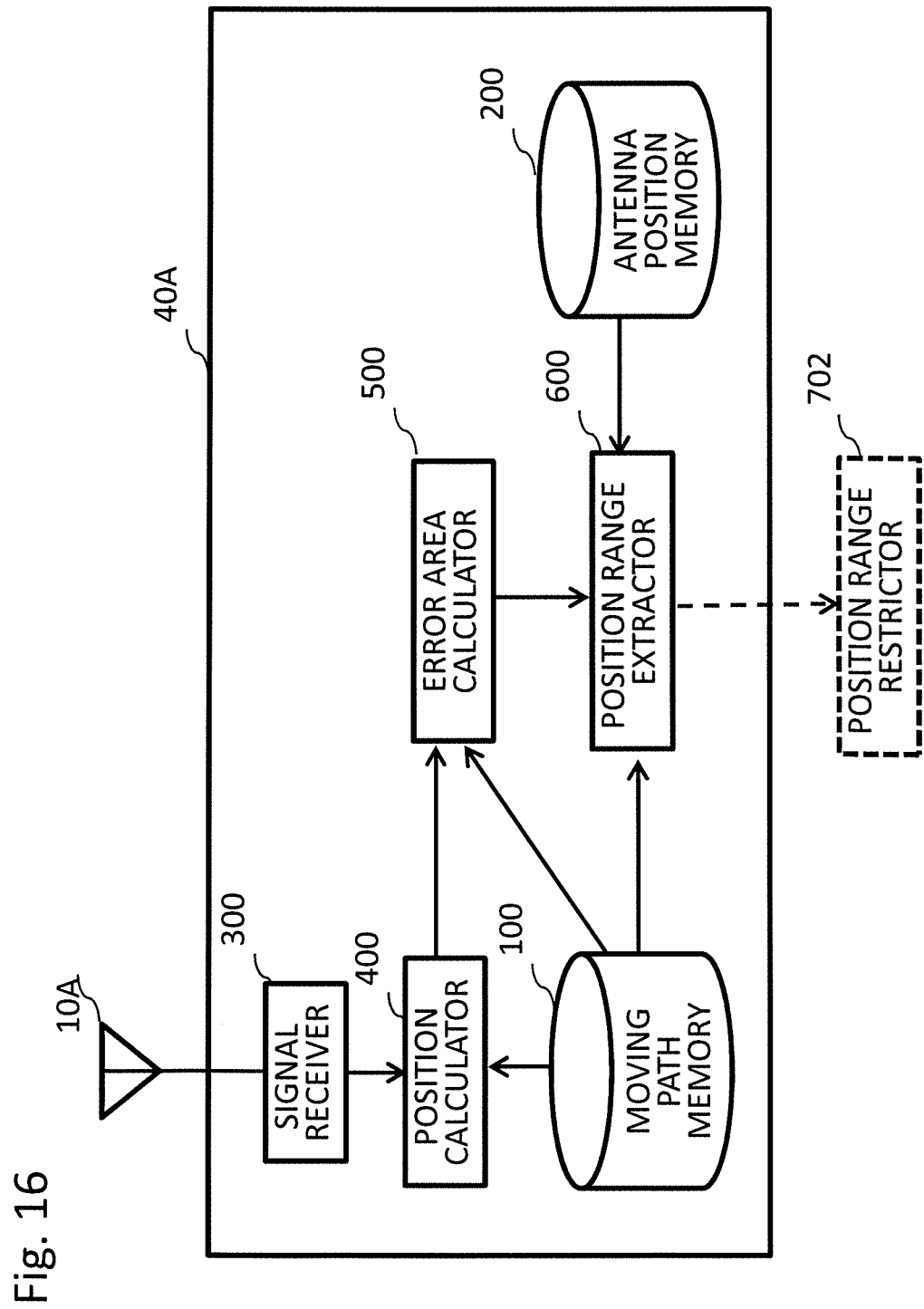
FIG. 16 is a diagram showing an exemplary configuration of a position range calculator according to the fourth embodiment of the present invention.
Figure 17:
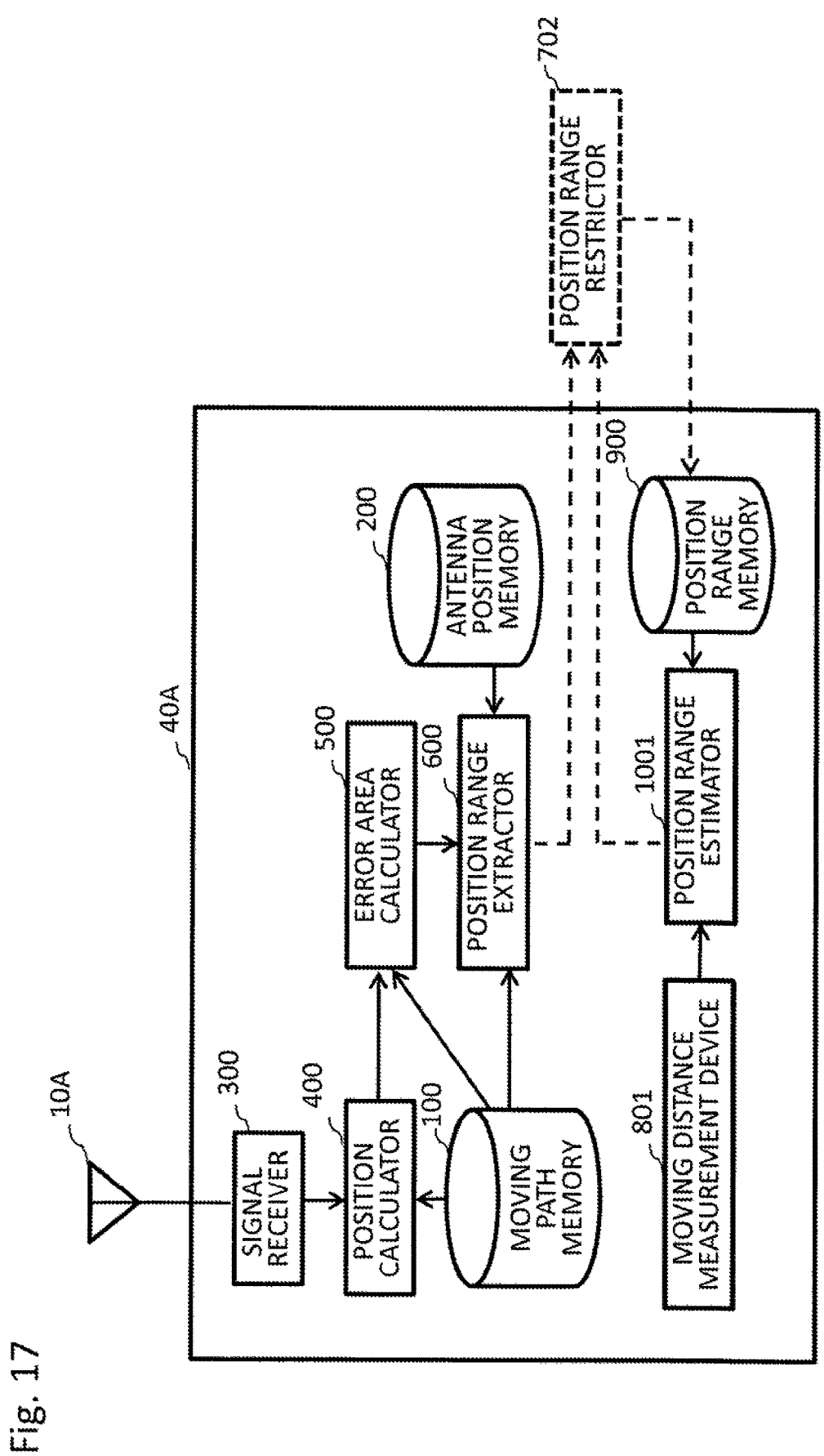
FIG. 17 is a diagram showing another exemplary configuration of the position range calculator according to the fourth embodiment of the present invention.

FIG. 16 is a diagram showing an exemplary configuration of the position range calculator 40A. The position range calculator 40A shown in FIG. 16 is configured by omitting the position range restrictor 700 from the satellite positioning apparatus 20A shown in FIG. 1. In addition, FIG. 17 is a diagram showing another exemplary configuration of the position range calculator 40A. The position range calculator 40A shown in FIG. 17 is configured by omitting the position range restrictor 701 from the satellite positioning apparatus 20C shown in FIG. 13. It should be noted that the same reference numerals are given to similar components to those shown in FIG. 1 or FIG. 12, and their description will be omitted. The second position range calculator 40B also has a similar configuration to that of the first position range calculator 40A.

According to the satellite positioning apparatus 20D of the fourth embodiment, candidate position ranges are calculated for each receiving antenna. Therefore, for example, even when one receiving antenna is in an environment of receiving a multipath wave, the other receiving antenna may be in an environment of not receiving a multipath wave, and therefore, it is possible to limit the position range by calculating the position range of the train 1 based on the received results of the latter receiving antenna. In addition, the satellite positioning apparatus 20D according to the fourth embodiment also has similar advantageous effects to those described in the first embodiment, the second embodiment, and the third embodiment.

Although a train has been described as an example of a moving object in the first to fourth embodiments, the above-described principle can be applied to a moving object that moves along a predetermined path, not limited to a train. The above-described principle can also be applied to, for example, an automobile that moves along a road.

Fifth Embodiment

Figure 18:
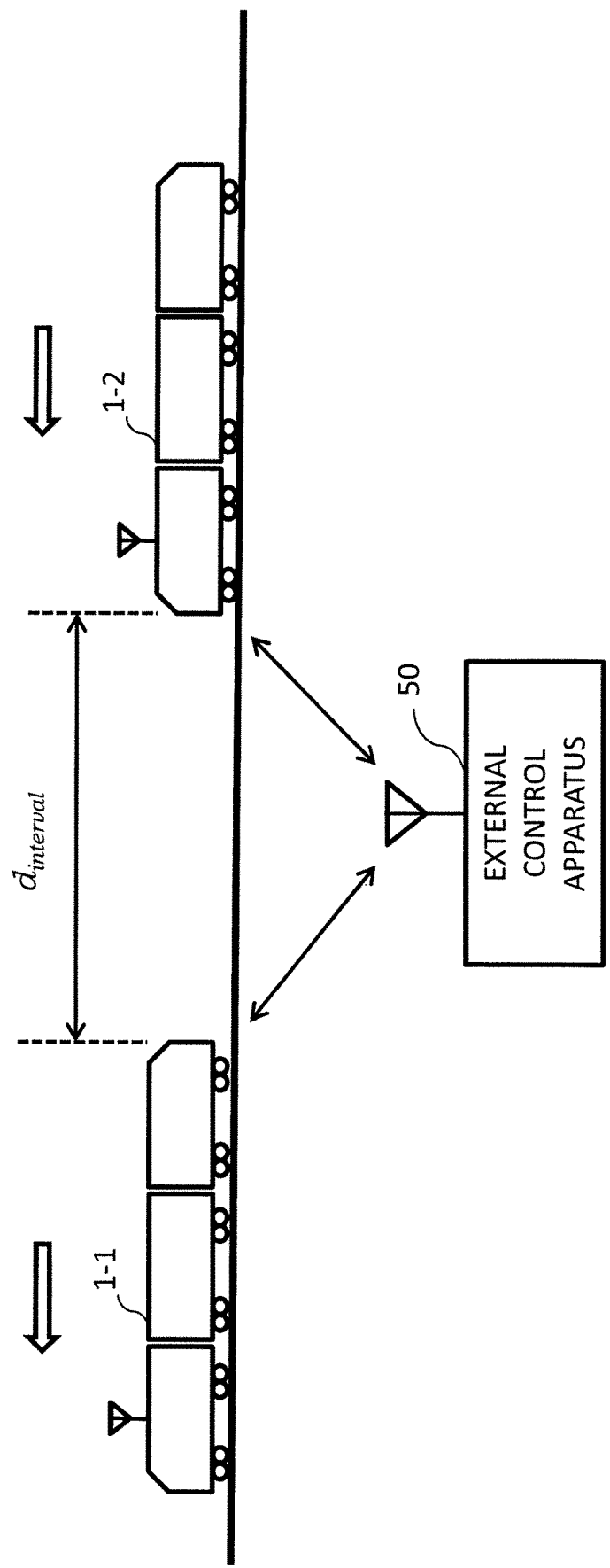
FIG. 18 is a diagram showing an exemplary configuration of a train control system according to a fifth embodiment of the present invention.

FIG. 18 is a diagram showing an exemplary configuration of a train control system according to a fifth embodiment of the present invention. The train control system in FIG. 18 includes a plurality of satellite positioning apparatuses provided to a plurality of trains 1-1 and 1-2, respectively. Each satellite positioning apparatus is configured according to any one of the first to fourth embodiments. The trains 1-1 and 1-2 are running in the same direction. The train control apparatus 30 of the train 1-2 calculates a virtual train interval $d_{interval}$, which is a difference between a front end of a position range of the train 1-2, and a rear end of a position range of the train 1-1 running in front of the train 1-2, based on the respective position ranges of the train 1-1 and 1-2 determined using the satellite positioning apparatuses. The train control apparatus 30 of the train 1-2 controls a speed of the train 1-2 based on the virtual train interval and a braking distance of the train 1-2 (in particular, a braking distance with which the train can safely stop).

With such a configuration, it is possible to control the train while satisfying safety required for a security apparatus. Information on the respective position ranges calculated by the trains may be exchanged via an external control apparatus 50 installed outside a track, or may be directly exchanged between the trains 1-1 and 1-2.

REFERENCE SIGNS LIST 1, 1-1, 1-2: TRAIN,
10: RECEIVING ANTENNA,
10A: FIRST RECEIVING ANTENNA,
10B: SECOND RECEIVING ANTENNA,
20A, 20B, 20C: SATELLITE POSITIONING APPARATUS,
30: TRAIN CONTROL APPARATUS,
40A: FIRST POSITION RANGE CALCULATOR,
40B: SECOND POSITION RANGE CALCULATOR,
50: EXTERNAL CONTROL APPARATUS,
100: MOVING PATH MEMORY,
200: ANTENNA POSITION MEMORY,
300: SIGNAL RECEIVER,
310: HIGH-FREQUENCY SIGNAL PROCESSOR,
320: BASEBAND SIGNAL PROCESSOR,
400: POSITION CALCULATOR,
500: ERROR AREA CALCULATOR,
600: POSITION RANGE EXTRACTOR,
700, 701, 702: POSITION RANGE RESTRICTOR,
800: MOVING DISTANCE MEASUREMENT DEVICE,
900: POSITION RANGE MEMORY,
1000, 1001: POSITION RANGE ESTIMATOR,
1100, 1101: POSITION RANGE DETERMINER,
$S_1$ to $S_n$: POSITIONING SATELLITE.

The invention claimed is:

1. A satellite positioning apparatus for determining a positional range of a moving object based on a plurality of satellite positioning signals received from a plurality of positioning satellites, respectively, the satellite positioning apparatus comprising:

a moving path memory that stores, in advance, a moving path of the moving object;

a signal receiver that receives the satellite positioning signals through a receiving antenna mounted at a predetermined position on the moving object;

a position calculator that calculates measured positions and receiver clock errors, based on satellite positioning signals received from three positioning satellites having a predetermined relationship among their relative positions, and based on the moving path, the measured positions indicating results of positioning the moving object, and the receiver clock errors indicating errors among clocks of the positioning satellites and a clock of the satellite positioning apparatus;

an error area calculator that sets a plurality of vector pairs, each of the vector pairs consisting of arbitrary two vectors perpendicular to each other on a plane spanned by a tangent vector and a radial vector of a tangent circle of the moving path at the measured position, and calculates an error area for each of the vector pairs, based on the measured positions, the receiver clock errors, and positions of the three positioning satellites used for positioning the moving object, the error area indicating an area on the plane in which the moving object may be positioned, thereby calculating a plurality of error areas corresponding to the plurality of vector pairs; and a positional range determiner that determines the positional range of the moving object based on the plurality of error areas and the moving path, wherein each one error area of the plurality of error areas is a rectangular area having sides along two vectors of a vector pair corresponding to the one error area, wherein lengths of the sides of the one error area depend on angles among vectors toward the measured positions from the positions of the three positioning satellites used for positioning the moving object, and the two vectors of the vector pair corresponding to the one error area, wherein the lengths of the sides of the one error area further depend on the receiver clock errors, and wherein each of the plurality of vector pairs is set to minimize lengths of sides of an error area corresponding to the vector pair.

2. The satellite positioning apparatus as claimed in claim 1, wherein the moving object is a train.

3. The satellite positioning apparatus as claimed in claim 1, wherein the moving object is an automobile.

4. A satellite positioning apparatus for determining a positional range of a moving object based on a plurality of satellite positioning signals received from a plurality of positioning satellites, respectively, the satellite positioning apparatus comprising:

a moving path memory that stores, in advance, a moving path of the moving object;

a signal receiver that receives the satellite positioning signals through a receiving antenna mounted at a predetermined position on the moving object;

a position calculator that calculates measured positions and receiver clock errors, based on satellite positioning signals received from three positioning satellites having a predetermined relationship among their relative positions, and based on the moving path, the measured positions indicating results of positioning the moving object, and the receiver clock errors indicating errors among clocks of the positioning satellites and a clock of the satellite positioning apparatus;

an error area calculator that sets a plurality of vector pairs, each of the vector pairs consisting of arbitrary two vectors perpendicular to each other on a plane spanned by a tangent vector and a radial vector of a tangent circle of the moving path at the measured position, and calculates an error area for each of the vector pairs, based on the measured positions, the receiver clock errors, and positions of the three positioning satellites used for positioning the moving object, the error area indicating an area on the plane in which the moving object may be positioned, thereby calculating a plurality of error areas corresponding to the plurality of vector pairs; and a positional range determiner that determines the positional range of the moving object based on the plurality of error areas and the moving path, wherein the position range determiner comprises:

a position range extractor that extracts a plurality of candidate position ranges corresponding to the plurality of error areas, by extracting, for each one error area of the plurality of error areas corresponding to the plurality of vector pairs, a part of the moving path included in the one error area, as a candidate position range corresponding to the one error area, and a position range restrictor that determines a common area of the plurality of candidate position ranges, as a position range of the moving object.

5. The satellite positioning apparatus as claimed in claim 4, wherein each one error area of the plurality of error areas is a rectangular area having sides along two vectors of a vector pair corresponding to the one error area, wherein lengths of the sides of the one error area depend on angles among vectors toward the measured positions from the positions of the three positioning satellites used for positioning the moving object, and the two vectors of the vector pair corresponding to the one error area, and wherein the lengths of the sides of the one error area further depend on the receiver clock errors.

6. The satellite positioning apparatus as claimed in claim 5, wherein each of the plurality of vector pairs is set to minimize lengths of sides of an error area corresponding to the vector pair.

7. The satellite positioning apparatus as claimed in claim 4, further comprising an antenna position memory that stores, in advance, a size of the moving object, and an installed position of the receiving antenna on the moving object, wherein the position range extractor extracts the plurality of candidate position ranges based on the size of the moving object and the installed position of the receiving antenna.

8. The satellite positioning apparatus as claimed in claim 4, further comprising:

a moving distance measurement device that measures a moving distance of the moving object from a first time $t_{ref}$ to a second time $t_{now}$ after the first time $t_{ref}$; and a position range estimator that calculates a position range of the moving object at the second time $t_{now}$ by adding the moving distance to a reference position of the moving object at the first time $t_{ref}$, when a size of the position range of the moving object determined by the position range restrictor exceeds a predetermined threshold value.

9. The satellite positioning apparatus as claimed in claim 4, further comprising:

a moving distance measurement device that measures a moving distance of the moving object from a first time $t_{before}$ when the satellite positioning signals are received, to a second time $t_{now}$ when the satellite positioning signals are received after the first time $t_{before}$;

a position range memory that stores a position range of the moving object at the first time $t_{before}$; and a position range estimator that calculates an estimated position range of the moving object at the second time $t_{now}$ by adding the moving distance to the position range of the moving object at the first time $t_{before}$, wherein the position range restrictor determines a common area of the plurality of candidate position ranges and the estimated position range, as a position range of the moving object.

10. The satellite positioning apparatus as claimed in claim 4, wherein the moving object includes a plurality of receiving antennas provided to a plurality of predetermined positions different from each other, on the moving object, respectively;

wherein the satellite positioning apparatus comprises, for each of the plurality of receiving antennas, the signal receiver, the position calculator, the error area calculator, and the position range extractor; and, wherein the position range restrictor determines, as a position range of the moving object, a common area of a plurality of candidate position ranges extracted by a plurality of position range extractors corresponding to the plurality of receiving antennas, respectively.

11. The satellite positioning apparatus as claimed in claim 4,
wherein the moving object is a train.

12. The satellite positioning apparatus as claimed in claim 4,
wherein the moving object is an automobile.

13. A train control system comprising a plurality of the satellite positioning apparatuses, the plurality of the satellite positioning apparatuses being provided to a plurality of trains, respectively,
wherein each one satellite positioning apparatus of the plurality of the satellite positioning apparatuses determines a positional range of a train based on a plurality of satellite positioning signals received from a plurality of positioning satellites, respectively, the satellite positioning apparatus comprising:
a moving path memory that stores, in advance, a moving path of the train;
a signal receiver that receives the satellite positioning signals through a receiving antenna mounted at a predetermined position on the train;
a position calculator that calculates measured positions and receiver clock errors, based on satellite positioning signals received from three positioning satellites having a predetermined relationship among their relative positions, and based on the moving path, the measured positions indicating results of positioning the train, and the receiver clock errors indicating errors among clocks of the positioning satellites and a clock of the satellite positioning apparatus;
an error area calculator that sets a plurality of vector pairs, each of the vector pairs consisting of arbitrary two vectors perpendicular to each other on a plane spanned by a tangent vector and a radial vector of a tangent circle of the moving path at the measured position, and calculates an error area for each of the vector pairs, based on the measured positions, the receiver clock errors, and positions of the three positioning satellites used for positioning the train, the error area indicating an area on the plane in which the train may be positioned, thereby calculating a plurality of error areas corresponding to the plurality of vector pairs; and
a positional range determiner that determines the positional range of the train based on the plurality of error areas and the moving path,
wherein each one error area of the plurality of error areas is a rectangular area having sides along two vectors of a vector pair corresponding to the one error area,
wherein lengths of the sides of the one error area depend on angles among vectors toward the measured positions from the positions of the three positioning satellites used for positioning the train, and the two vectors of the vector pair corresponding to the one error area,
wherein the lengths of the sides of the one error area further depend on the receiver clock errors,
wherein each of the plurality of vector pairs is set to minimize lengths of sides of an error area corresponding to the vector pair, wherein the train control system calculates, based on position ranges of the trains determined using the satellite positioning apparatuses, a virtual train interval that is a difference between a front end of a position range of a first train among the plurality of trains, and a rear end of a position range of a second train among the plurality of trains, the second train moving in front of the first train, and wherein the train control system controls a speed of the first train based on the virtual train interval and a braking distance of the first train.

14. A train control system comprising a plurality of the satellite positioning apparatuses, the plurality of the satellite positioning apparatuses being provided to a plurality of trains, respectively,
wherein each one satellite positioning apparatus of the plurality of the satellite positioning apparatuses determines a positional range of a train based on a plurality of satellite positioning signals received from a plurality of positioning satellites, respectively, the satellite positioning apparatus comprising:
a moving path memory that stores, in advance, a moving path of the train;
a signal receiver that receives the satellite positioning signals through a receiving antenna mounted at a predetermined position on the train;
a position calculator that calculates measured positions and receiver clock errors, based on satellite positioning signals received from three positioning satellites having a predetermined relationship among their relative positions, and based on the moving path, the measured positions indicating results of positioning the train, and the receiver clock errors indicating errors among clocks of the positioning satellites and a clock of the satellite positioning apparatus;
an error area calculator that sets a plurality of vector pairs, each of the vector pairs consisting of arbitrary two vectors perpendicular to each other on a plane spanned by a tangent vector and a radial vector of a tangent circle of the moving path at the measured position, and calculates an error area for each of the vector pairs, based on the measured positions, the receiver clock errors, and positions of the three positioning satellites used for positioning the train, the error area indicating an area on the plane in which the train may be positioned, thereby calculating a plurality of error areas corresponding to the plurality of vector pairs; and
a positional range determiner that determines the positional range of the train based on the plurality of error areas and the moving path,
wherein the position range determiner comprises:
a position range extractor that extracts a plurality of candidate position ranges corresponding to the plurality of error areas, by extracting, for each one error area of the plurality of error areas corresponding to the plurality of vector pairs, a part of the moving path included in the one error area, as a candidate position range corresponding to the one error area,
a position range restrictor that determines a common area of the plurality of candidate position ranges, as a position range of the train,
wherein the train control system calculates, based on position ranges of the trains determined using the satellite positioning apparatuses, a virtual train interval that is a difference between a front end of a position range of a first train among the plurality of trains, and a rear end of a position range of a second train among the plurality of trains, the second train moving in front of the first train, and wherein the train control system controls a speed of the first train based on the virtual train interval and a braking distance of the first train.

\* \* \* \* \*